United States Patent [19]

Smyth

[11] Patent Number: 4,500,202

[45] Date of Patent: Feb. 19, 1985

[54] PRINTED CIRCUIT BOARD DEFECT DETECTION OF DETECTING MAXIMUM LINE WIDTH VIOLATIONS

[75] Inventor: Bruce E. Smyth, Waltham, Mass.

[73] Assignee: Itek Corporation, Lexington, Mass.

[21] Appl. No.: 521,045

[22] Filed: Aug. 8, 1983

Related U.S. Application Data

[63] Continuation-in-part of Ser. No. 381,618, May 24, 1982.

[51] Int. Cl.³ .............................................. G06K 9/00
[52] U.S. Cl. ..................... 356/237; 356/394; 356/398; 382/8
[58] Field of Search ............... 356/237, 384, 387, 394, 356/398; 250/560, 572; 382/8

[56] References Cited

U.S. PATENT DOCUMENTS

| | | | |
|---|---|---|---|
| 3,389,789 | 6/1968 | Watson et al. | 209/75 |
| 3,665,326 | 5/1972 | Sullivan | 328/151 |
| 3,969,577 | 7/1976 | Lloyd et al. | 178/6.8 |
| 3,987,244 | 10/1976 | Messman | 178/7.2 |
| 4,083,035 | 4/1978 | Riganati et al. | 340/146.3 E |
| 4,152,723 | 5/1979 | McMahon et al. | 358/106 |
| 4,185,298 | 1/1980 | Billet et al. | 358/106 |
| 4,240,750 | 12/1980 | Kurtz et al. | 356/394 |
| 4,251,837 | 2/1981 | Janeway | 358/280 |
| 4,259,662 | 3/1981 | Yoshida | 340/146.3 AG |
| 4,269,515 | 5/1981 | Altman | 356/394 |
| 4,295,120 | 10/1981 | Yoshida | 340/146.3 MA |
| 4,295,198 | 10/1981 | Copeland et al. | 364/515 |
| 4,300,122 | 11/1981 | McMahon | 340/146.3 MA |
| 4,301,471 | 11/1981 | Holscher et al. | 358/105 |
| 4,345,314 | 8/1982 | Melamud et al. | 364/515 |
| 4,392,120 | 7/1983 | Mita et al. | 356/384 |
| 4,403,294 | 9/1983 | Hamada et al. | 364/507 |

OTHER PUBLICATIONS

"The Inspectron: An Automatic Optical Printed Circuit Board (PCB) Inspector" by William A. Bentley, SPIE, vol. 201, *Optical Pattern Recognition* (1979), pp. 37–47.

"An Automatic Optical Printed Circuit Inspection System" by Robert C. Restrick, III, SPIE, vol. 116 *Solid State Imaging Devices* (1977).

"Distance Checking Algorithms" by Per-Erik Danielsson & Bjorn Kruse, Linkoping University, Dept. of Electrical Engineering, 09-21-1977.

"An Automatic Inspection System for Printed Wiring Board Masks" by Goto et al., *Pattern Recognition*, vol. 12, pp. 443–455, Pergamon Press Ltd. 1980.

"Automated Optical Inspection of Multilayer Printed Circuit Boards" by William A. Bentley, SPIE, vol. 220, *Optics in Metrology and Quality Assurance* (1980).

*Primary Examiner*—R. A. Rosenberger
*Attorney, Agent, or Firm*—Hamilton, Brook, Smith & Reynolds

[57] ABSTRACT

An automatic printed wiring (or circuit) board (PWB) method for detecting maximum line width violations is described. The method utilizes an array of optical sensors for optically inspecting a printed wire circuit. The array forms a binary image pattern of the PWB which is tested for compliance with logical rules of correctly printed PWB's regarding maximum line width. The detector comprises a plurality of CCD arrays arranged to form a series of pixels consisting of electronic binary signals corresponding to the instantaneous image viewed by each element in the CCD array. These pixels are formed in an image data stream of sequential pixels line-by-line of the CCD array, i.e., pixel sequential line sequential digital image data. The digital pixel data is formatted in an "N" by "N" bit matrix of points in proper image orientation. All such points are available for sampling. Each pixel progressively occupies each point in the matrix in proper orientation to its neighbors. Each pixel passes through each "N" bit point of the matrix thus forming a moving "window" of "N" by "N" bits in size of a portion of the image viewed by the CCD array. The contents of the matrix are addressed and selected and logic applied thereto to determine compliance with localized PWB principles.

4 Claims, 27 Drawing Figures

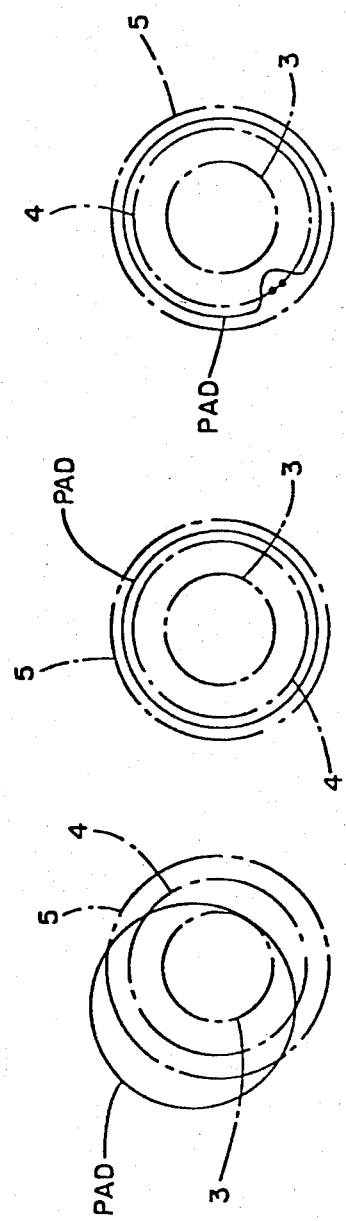

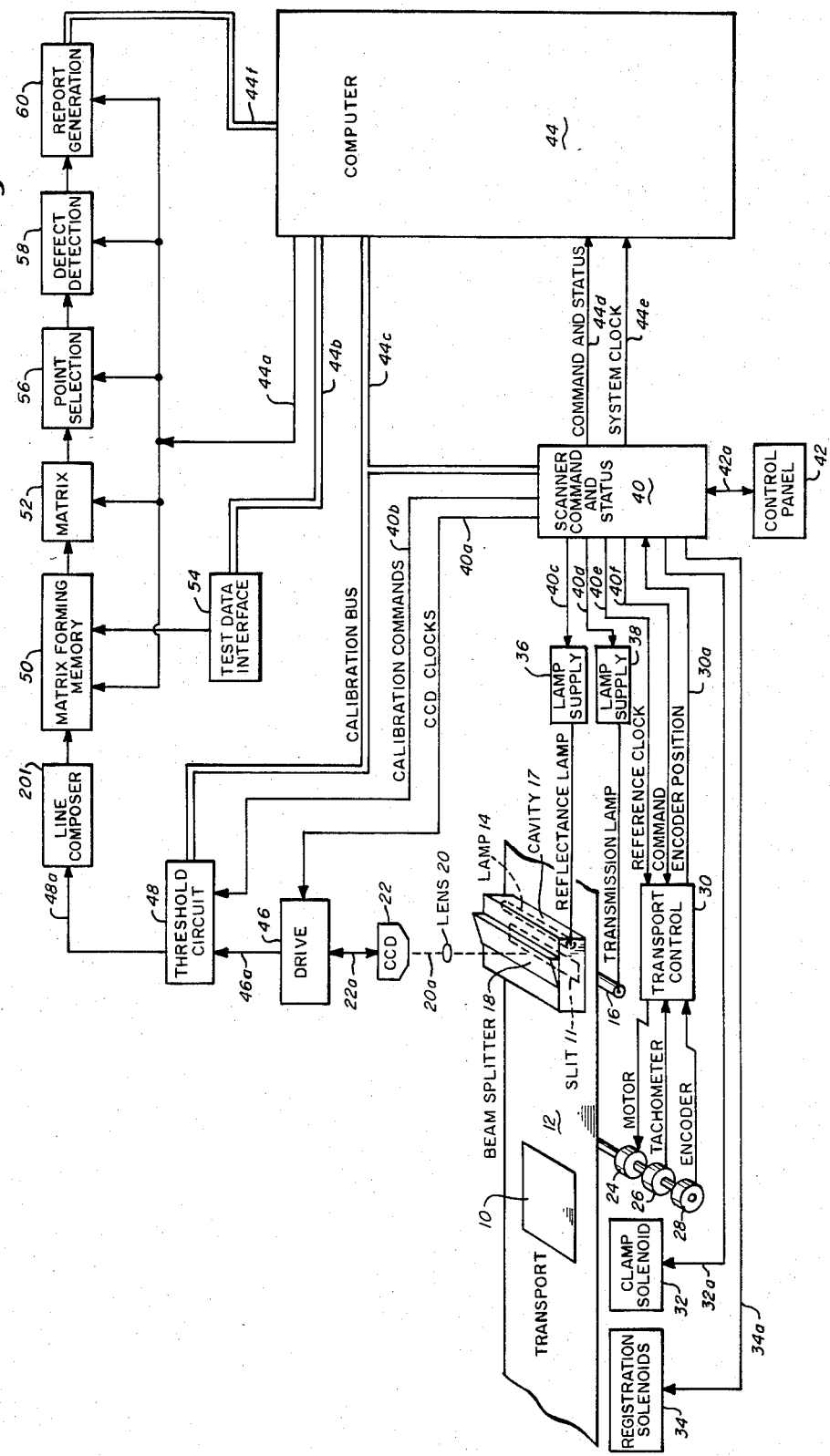

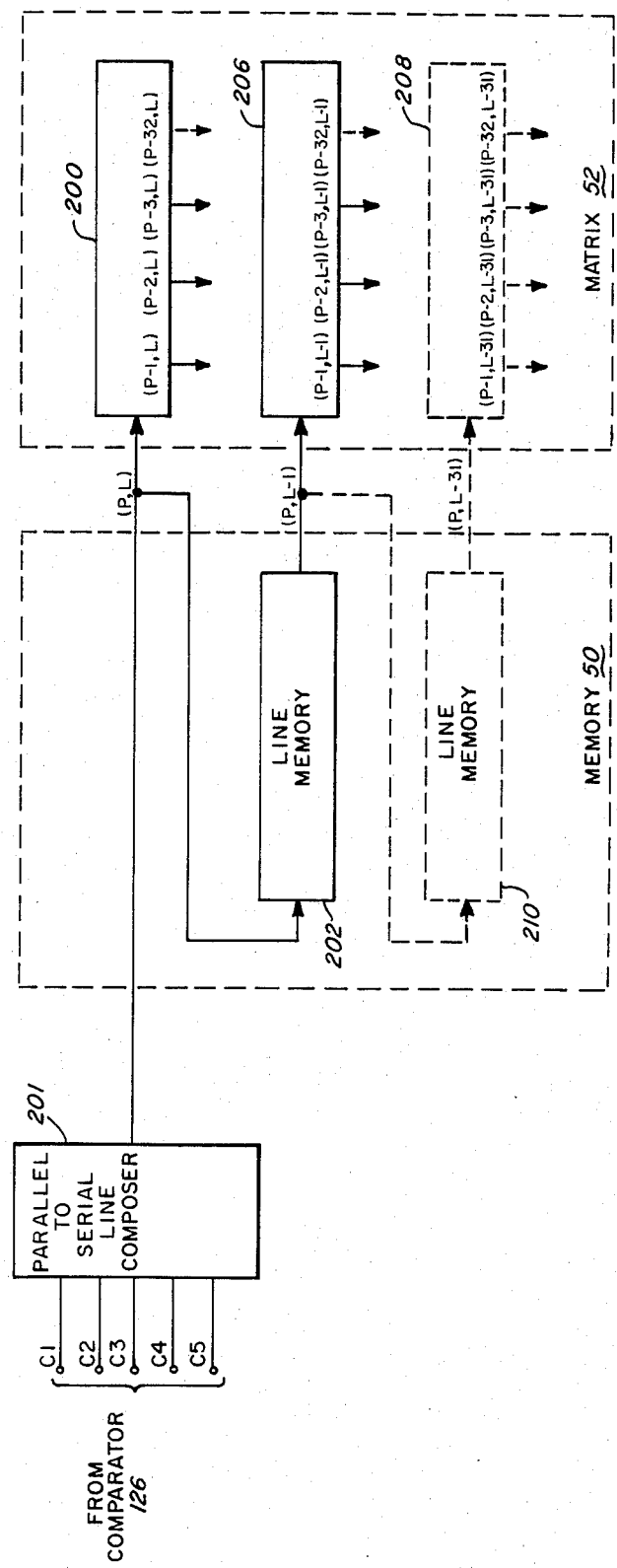

Fig. 17

SENSOR IS IMPLEMENTED
IN 9 ORIENTATIONS 20° APART.

CD$\overline{A}\overline{B}$=DEFECT

Fig. 18

SENSOR C (SMALL AREA DEFECT)

| A1 |    | A4 |    | A5 |
|----|----|----|----|----|
|    | B1 |    | B2 |    |
| A2 |    | B3 |    | A6 |
|    | B4 |    | B5 |    |
| A3 |    | A8 |    | A7 |

THICK LINE
PERFECT SYMMETRY

PAD
TOO LITTLE SYMMETRY FOR TEST

PRINTED CIRCUIT BOARD DEFECT DETECTION OF DETECTING MAXIMUM LINE WIDTH VIOLATIONS

BACKGROUND OF THE INVENTION

This is a continuation-in-part of application Ser. No. 381,618 filed May 24, 1982.

1. Field of the Invention

The present invention relates generally to an arrangement for optically inspecting the etched circuitry on a printed wiring circuit board, and more particularly pertains to an unique optical sensor for examining a printed wiring board for any defects thereon.

2. Discussion of the Prior Art

The detection of defective printed wire circuit boards presents a rather complex problem, the solution of which would yield significant and immediate economic benefits. This quality control problem extends from the fabrication of conventional printed wiring boards to the high resolution masks employed in photolithography for very large scale integrated (VLSI) circuits. A typical modern printed circuit board manufacturing facility is an interesting study in contrasts. Most of the fabrication operations such as printing, plating, drilling, routing, etc., are heavily automated. But, inspection of the completed boards is frequently performed manually by inspectors with magnifiers who visually check the boards and artwork for flaws. It turns out that in many cases, the inspection of a printed circuit board is as expensive as its manufacture because of the labor intensive activity involved therein.

The inspection of the inner layers of multilayer printed circuit boards is particularly important for a number of reasons. They are extremely difficult to inspect because of the small line width and the density and complexity of the patterns thereon. Moreover, a complete one hundred percent visual inspection of inner layer boards is usually required because of the expense of rejecting a completed laminated board at the final electrical test.

Automated inspection of printed circuit boards would appear to be particularly applicable to multilayer boards as they are often computer designed and plotter generated, which implies a uniformity of lines and spaces as well as an absence of lettering and extraneous markings in the circuitry area. Initial investigations into automated inspection of printed wire boards included consideration of image comparison techniques using either a master printed circuit board, the artwork, or a computer stored map. However, this concept was not pursued as troublesome problems were encountered. Since the instantaneous area of the scanned image, or pixel-under-test, must match the corresponding area of the master, exact alignment is necessary at every point on the board. Shrinking or swelling of the board due to changes in temperature or humidity would have to be compensated for, as would the normal and perfectly acceptable variations in the widths of the lines and spaces of the pattern. As a result of these problems, it became evident that the complexities inherent in the mechanization of this technique would make the finished instrument only marginally economical as a replacement for human inspectors.

Similar problems exist with a comparison of optical Fourier transforms. In this case, if a line at the edge of the scanned area is included in one field of view and omitted from the other as a result of scan misalignment, the Fourier energy distributions will not match.

Bentley in "the inspectron: an automated optical printed circuit board (PCB) inspector", SPIE Vol. 201, Optical Pattern Recognition (1979), p37–47, discloses an automated printed wire circuit board inspection machine which mechanically scans a hardwired distance-measuring sensor array of photodetectors over the circuit board and utilizes logical decisions on the image pattern of the illuminated and nonilluminated detector to detect defective circuit boards. The arrangement described by Bentley is similar to that of the present invention, but is not as logically efficient, as it employs only sixteen sensors in the second and third outer rings of sensors, rather than an arrangement of eighteen sensors in the second and third outer rings of sensors, which results in a logically efficient arrangement of sensors for reasons explained in greater detail below.

Restrick in "An Automatic Printed Circuit Inspection System" SPIE Vol. 116 Solid State Imaging Devices (1977) describes a system for printed circuit inspection which does not require mechanical scanning of the sensor array over the circuit board. Instead, optical sensors scan a swath of a board as the sample board moves by on a support table.

Three sensing units each scanning a 1.6 inch wide swath of the moving sample are used. A lens associated with each sensing unit images a moving sample onto a 1728 element linear solid-state optical sensor. The sensor is positioned perpendicular to the direction of motion so that the sample is scanned mechanically in one direction and electronically by the sensor in the other. The portion of the object being imaged onto the array is illuminated from each side by miniature tungsten-halogen lamps and cylindrical lenses.

Buffers are mounted close to the sensing array to relay the driving waveforms to it. The array output is amplified and quantized to binary levels-indicating the presence of one of two materials. The quantization is made by comparing the array output with threshold values. To correct for spatial nonuniformities in the illumination, optics, and sensor, each sensor has its own threshold value. As each successive element is read out, an eight bit digital threshold value, retrieved from a memory is converted to an analog value and substracted from it. The threshold values are created automatically by placing a uniform standard reflectance target in the optical system prior to inspection.

Shift registers store individual line scans. A special purpose processor consisting of registers to manipulate and temporarily store the data, and digital logic to implement the error detecting algorithm is required for each sensing unit. Six consecutive scan lines are stored by daisy chaining six 2048-bit shift registers. The array scans in the y direction and the object is scanned mechanically in the x direction. The output of each register is a bit stream representing successive y positions for fixed x. Six consecutive outputs from each of the six shift registers are stored in single bit registers. Simple combinational logic applies line width/line spacing criteria to the contents of the registers. With each clock pulse a new 6×6 area is stored in the shift registers and the error criteria applied.

As errors are detected, position sensing unit identification and error type (clearance or width) information are stored on a stack-organized memory. A microprocessor retrieves this information from the stack and stores it along with the table position. At the end of the inspection operation, the information is used to calculate x and y coordinates relative to the circuit being inspected, and the error locations are printed out.

SUMMARY OF THE INVENTION

Accordingly, it is a primary object of the present invention to provide an arrangement for optically inspecting a printed wiring circuit board based upon logical decisions resulting from an examination of binary image patterns representing the circuit board.

A further object of the subject invention is the provision of an arrangement of the aforementioned type which can be implemented by a relatively simple concentric array of sensors.

In accordance with the teachings herein, a first embodiment of the present invention provides an array of optical sensors for optically inspecting a printed wire circuit board. The array comprises a first inner ring of optical sensors arranged in a circle defining a diameter slightly less than the minimum specified wire line width on the circuit board. A second ring of optical sensors is positioned concentrically outside the first ring, and includes eighteen sensors spaced 20° apart, or multiples thereof with corresponding decreased angular spacing, defining a ring radius equal to the minimum specified wire line width on the circuit board. A third ring of optical sensors is positioned concentrically outside the second ring, and also includes eighteen sensors spaced 20° apart, or multiples thereof with correspondingly decreased angular spacing, defining a ring radius equal to the minimum specified wire line spacing on the circuit board plus the radius of the first inner ring.

In accordance with a further advantageous feature of the preferred embodiment, the concentricity of pads on the circuit board is tested by a fourth ring of optical sensors positioned concentrically outside the third ring and defining a diameter slightly less than the minimum specified diameter of a printed pad and a fifth ring of optical sensors positioned concentrically outside the fourth ring and defining a diameter slightly larger than the nominal specified diameter of a printed pad.

Pursuant to other disclosed embodiments of the subject invention, a printed wire circuit board can be optically inspected by implementing the same logical decisions as in the aforementioned concentric array of optical sensors, but wherein a binary image corresponding to the printed circuit board is obtained by a linear photodetector array or an equivalent scanner and is stored in memory. Pursuant to those embodiments, the binary image patterns of the printed circuit board stored in memory are tested for compliance with logical rules of correctly printed circuit boards by selectively combining the binary values from memory of pixels in the binary image to form an array of pixels corresponding to the aforementioned concentric rings of optical sensors. In greater particularity, the array is formed by a first inner ring of pixels defining a diameter slightly less than the minimum specified wire line width on the circuit board, and a second ring of pixels positioned concentrically outside the first ring, and comprising eighteen pixels spaced 20° apart around the ring and defining a radius equal to the minimum specified wire line width on the circuit board, and a third ring of pixels positioned concentrically outside the second ring, and also comprising eighteen pixels spaced 20° apart around the ring and defining a radius equal to the minimum specified spacing between adjacent wire lines on the circuit board plus the radius of the first inner ring.

In a further embodiment of the invention, the video signals from each scanned line of the photodetector array, after thresholding and digitizing, are accumulated in a plurality of shift registers, specifically in 32 shift registers each 32 bits in length. A moving "window" or "matrix" of "N" by "N" matrix points (in this case 32×32 or 1024 bit output points) is thus made available in the instantaneous contents of the shift registers. Each point in this matrix is in one of two possible logical states or polarities, that is, either an ON or OFF (a ONE or ZERO logic condition) depending on the instantaneous image viewed by a corresponding photodetector element in the array.

Any of the 1024 points in the matrix can be selected or addressed. The contents thereof can be selected and a variety of logical principles applied thereto to determine if the image available in the 32×32 bit matrix window violates logical printed circuit board principles. Specifically, in the preferred embodiment defects can be detected, such as (a) the presence of unterminated lines, (b) failure to meet minimum conductor width and spacing specifications, (c) the presence of holes in small areas of conductors or conductors in small areas of insulators, or (d) the presence of conductors having line widths in excess of specification. Moreover, a point select capability permits the system to apply the defect detection logic to a plurality of line width and spacing sizes. For example, in a preferred embodiment of the system conductor widths and spaces of 0.003 inches to 0.0105 inches can be accommodated in increments of 0.0005 inches.

BRIEF DESCRIPTION OF THE DRAWINGS

The foregoing objects and advantages of the present invention for an optical sensor for printed circuit board defect detection may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 6, 7 and 8 illustrate the operation of a third type of algorithm for detecting errors in pad concentricity by utilizing the sensor array of FIG. 1.

FIG. 9 is a schematic block diagram of a further embodiment of the invention capable of determining defects for a plurality of printed wire board conductor widths and spaces.

FIG. 12 is a schematic illustration of the matrix forming memory 50 and matrix 52 circuits of FIG. 9.

FIG. 17 is a representation of the pattern for the Sensor B ring.

FIG. 18 is a representation of the sensor pattern for Sensor C circuit (small area defect).

DETAILED DESCRIPTION OF THE DRAWINGS

The logic utilized by the present invention is based upon given inherent characteristics of a correctly produced printed wire circuit board, including the following:

1. All circuit lines end in pads, and any line that does not is almost certainly broken, and can be consdered an error.

2. All circuit lines have a specified minimum line width. There is also a minimum line spacing which is usually but not necessarily identical with the minimum line width. Therefore, if a feature is found on a circuit board which has any dimension smaller than this minimum, it must be an error, either an illegal width line, an illegal width space, a piece of spurious copper, or a void in a copper area.

3. Any copper feature the smallest dimension of which is much larger than a standard line but smaller than a pad is an error, either a broken pad or a spurious copper blob.

New high density or fine line printed wiring boards are characterized by the following tolerances in conductor width, spacing and pad size:

|  | Nominal, (in.) | Minimum, (in.) |
|---|---|---|
| conductor widths | 0.008 | 0.006 |
| conductor-conductor spacing | 0.008 | 0.006 |
| pad diameter | 0.055 | 0.050 |

The present invention is designed to detect defects on a printed-wiring circuit board, and a preferred embodiment comprises an array of five concentric rings of optical sensors. The sensors are binary in that they register a one if looking at conductive material, and a ZERO otherwise. With a typical printed circuit board, each detector is energized to an "on" or one state by reflection from a pixel (the increment of area which the detector is examining) formed of bright copper, and each detector is de-energized to an "off" or ZERO state by reflection from a pixel formed of the matte substrate. Furthermore, negatives can be examined by a simple inversion of the state of each pixel. Moreover, the threshold determination for each detector between a one state and a ZERO state could be a dynamic determination wherein the output of each detector or plurality of detectors is evaluated and weighed in making the threshold determination. The detectors are arranged such that certain patterns of ones and zeros imply a defective area on the circuit board.

Figure 1:
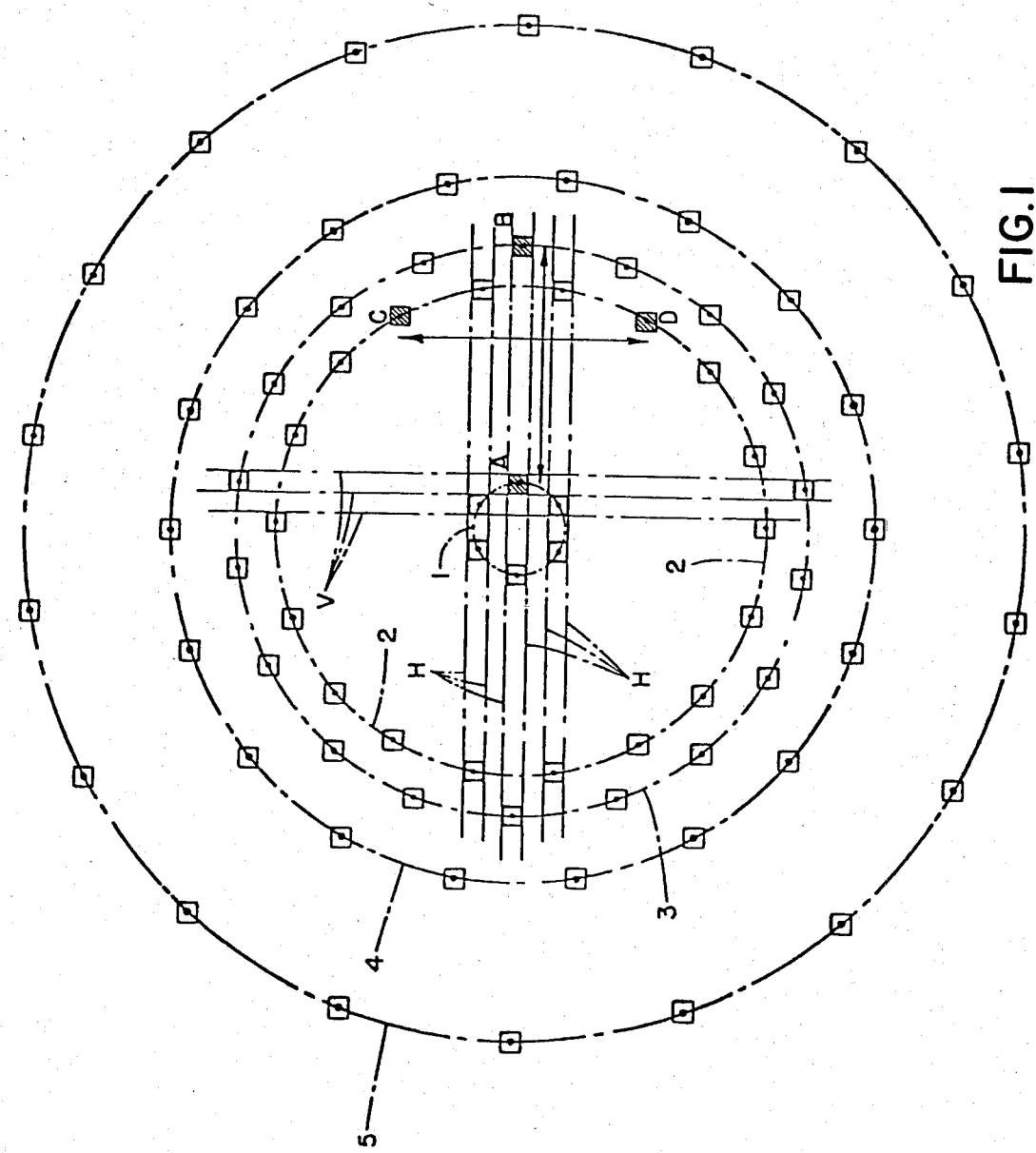
FIG. 1 is an exemplary embodiment of a scanning array comprising five concentric rings of binary photosensors constructed pursuant to the teachings of the present invention.

Referring to FIG. 1, an inner ring 1 comprises six sensors or detectors arranged in a circe having a nominal diameter slightly smaller than the minimum specified printed circuit line width. Accordingly, as the six detectors are being scanned across the width of a line, they will all be one, producing binary one outputs, when the line is substantially centered with respect to the sensor array 1, which then enables other tests to be performed. For this reason, the inner ring 1 is functionally an enable ring, and the six detectors thereon are logically ANDed together to produce an enable signal for the detector array.

When all six detectors in ring 1 are on, there is sufficient conductor to test, and rings 2 and 3 are then enabled and used to test line errors and small surface defects. There are eighteen sensors (20° apart) on each of rings 2 and 3. The radius of ring 2 is equal to the minimum specified printed line width. The radius of ring 3 minus the radius of ring 1 is equal to the minimum line spacing. The sensor intervals of 20° give a rhomboid shape to the array of detectors A,B,C,D with the distance between A and B equal to the minimum specified line spacing and the distance between C and D equal to the minimum specified line width. This same rhomboid pattern is repeated every 20° around the array. The embodiment of FIG. 1 illustrates six sensors in the first ring, which means each sensor covers a radial magnitude of 60° in the measurements explained below. In an alternative embodiment a lesser or greater number of sensors could be utilized in the first ring. However, the six sensor arrangement is easily implemented in the rectangular array of horizontal and vertical lines H and V, explained infra.

The arrangement of the present invention positions eighteen sensors around the second and third sensor rings, rather than sixteen as taught by the prior art. The inventive arrangement is advantageous relative to the prior art approach as the angular spacing between the two sensors CD, relative to the center of the array, is now by definition 60° (eighteen sensors around 360° produce an arc of 20° between each pair of adjacent sensors). This results in an equilateral triangle being formed between the center of the array and each pair of sensors CD. Two sides of the triangle are equal to the radius of ring 2, which equals the minimum specified printed line width, which also equals the distance between the pair of sensors CD. Thus, an arrangement of eighteen sensors results in the distance between each pair of sensors CD being equal to the minimum specified printed line width. In alternative embodiments, multiples of eighteen sensors, for instance thirty-six sensors spaced 10° apart or seventy-two sensors spaced 5° apart, could also be utilized as the same logical reasoning (as explained above with regard to equilateral triangles being formed by an eighteen sensor array) would also apply to multiples of eighteen sensors.

Figure 2:
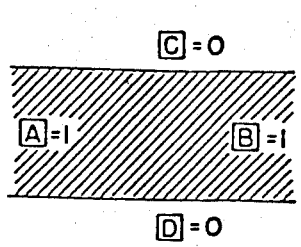
FIGS. 2, 3 and 4 illustrate three different types of defects which are uncovered by operation of one general algorithm implemented by the sensor array of FIG. 1.
Figure 3:
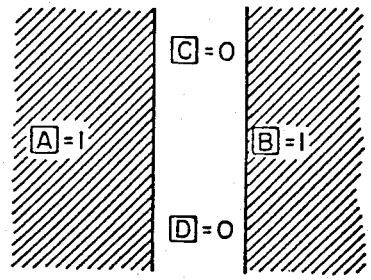
Figure 4:
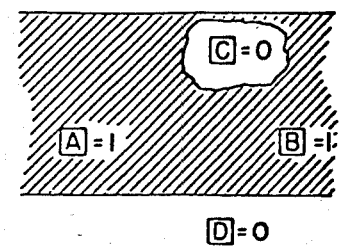

The pattern defines two error conditions. Respecting the first error condition, for an error free condition, if A and B are on, either C or D must also be on. The logical expression for this condition is: Error=$A \cdot B \cdot \overline{C} \cdot \overline{D}$. Explained in greater detail, with A and B on, each represents a 1 in the aforementioned equation, and if neither C nor D is on, each represents a 0, and $\overline{C}$ and $\overline{D}$ both represent a 1, which yields a 1 output for the above equation, indicating an error. ON the other hand, if either C or D is on, then it represents a 1, which inverts as $\overline{C}$ or $\overline{D}$ to a 0, which yields a 0 for the above equation, indicating no error. For instance, assume A and B are on (A will be on once Ring 1 is enabled anyway) and both C and D are off. There are three possible conditions: (1) the sensor is on a too narrow line, as shown in FIG. 2; (2) the sensor has reached across a too narrow space as illustrated in FIG. 3; or (3) the sensor is on a small surface defect (short, cracked pad, pinhole, etc.) as shown in FIG. 4. As mentioned above, the pattern of ABCD is repeated eighteen times, i.e., every 20° around the concentric detector array, and therefore the total first error condition is the logical OR of the output of all eighteen individual logic patterns (Error = A·B·$\overline{C}$·$\overline{D}$).

Figure 5:
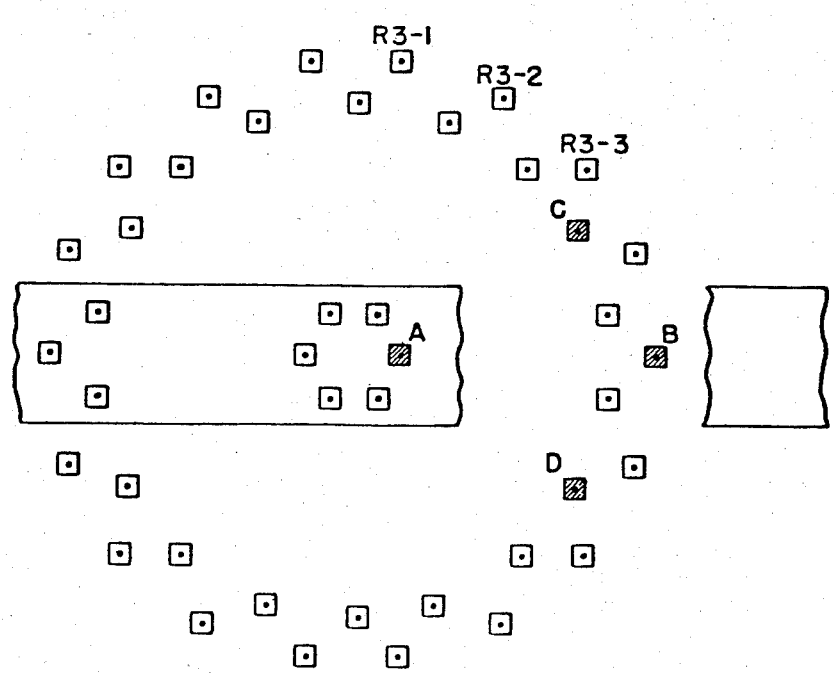
FIG. 5 shows a broken printed line type of board defect uncovered by operation of a second algorithm implemented on the sensor array of FIG. 1.

The second error condition concerns a break or open in a line. If more than a given number (n) of the sensors are OFF after enable, then this condition indicates that a line comes into the pattern, but fails to emerge therefrom, as shown in FIG. 5. The error condition of FIG. 5 would be indicated by the logic Error = $\overline{R3\text{-}1}$ $\overline{R3\text{-}2}$ $\overline{RE\text{-}3}$ ... $\overline{R3\text{-}n}$ (where R3 refers to Ring 3 and n refers to the $n^{th}$ sensor in that ring and may for instance be n=15 (of 18). This pattern is also repeated eighteen times around ring 3, with each logical expression omitting 18-n (3 in the example) sensors in a row. Therefore, the total error condition is the logical OR of the output of all eighteen individual logic patterns. Another sensor ring other than ring 3, for example ring 2 or ring 4, could be utilized instead of ring 2 in this test.

Rings 4 and 5 are used to test pad concentricity. The radius of ring 4 is slightly smaller than the minimum specified pad radius, while the radius of ring 5 is slightly larger than the minimum specified pad radius. Ring 3 is used as a pad enable switch for the pad concentricity test, and Ring 5 is used to determine centering. When every sensor in ring 3 is on and 90% of the sensors in ring 5 are off, ring 4 is used to test the pad shape. For instance, as shown in FIG. 6, less than 90% of the sensors in ring 5 are off, and so the concentricity test is not enabled. In the relative positions shown in FIG. 7, the concentricity test is enabled, and the pad passes the test. However, in the condition shown in FIG. 8, which has the same relative positions as in FIG. 7, a mousebite is present in the pad, leaving two sensors in ring 4 off, thereby indicating an error in pad concentricity. This error condition can be expressed mathematically as the sum $\overline{R4_1}$, $\overline{R4_2}$, $\overline{R4_3}$, ... $\overline{R4_K}$, less than or equal to n, where $\overline{R4_K}$ is the $K^{th}$ detector on ring 4 and n is the number of sensors in the ring, and further wherein n can be either a logically or experimentally derived number, for instance 90% of the total number of detectors on the ring. Unlike the second and third rings of sensors, the number of sensors in the fourth and fifth rings does not appear to be critical, but should include a sufficient number of sensors in each ring to ensure the required accuracy. FIG. 1 illustrates eighteen sensors in each of the fourth and fifth rings, but lesser or greater numbers of sensors are easily utilizable with the algorithmic approach explained herein.

A concentric ring testing arrangement as described above would also advantageously indicate errors in circuit boards which the testing arrangement is not designed to detect because of the following common characteristics of defective circuit boards. Large and irregular areas of excessive copper usually contain small branches and irregular corners which would normally be detected by the concentric ring testing arrangement. When an entire line is missing, nearby lines are frequently thinned or broken, and would normally be detected as errors. Oversized lines usually encroach into adjoining spaces, and thereby would be detected as violations of the minimum spacing requirements.

Pursuant to other disclosed embodiments of the subject invention, the concentric ring sensor arrangement of FIG. 1 could be constructed from a commercially available small rectangular or linear array of photodetectors with a light fiber leading from each sensor or pixel position in the concentric ring arrangement of FIG. 1 to a separate sensor in the detector array. Moreover, as shown by the array of horizontal lines H and the array of vertical lines V in FIG. 1, the arrangement of sensors in the concentric rings are positioned regularly in a rectangular array, and therefore the concentric ring arrangement could be constructed directly on a large rectangular array of photodetectors.

Furthermore, the digital imaging information need not be obtained in parallel for logical operation in real time, but could also be obtained in series by sequentially scanning different areas of the board, for instance with sequential line scans, and storing the digital imaging information in memory. In embodiments of this nature, the binary imaging information for each requisite pixel of the concentric ring array could be retrieved from memory for each logical test, and the entire circuit board could be tested using the same algorithms explained with reference to FIG. 1, but operating sequentially solely on data retrieved from memory.

Alternatively, instead of storing the entire digital imaging information in memory and then logically testing the entire circuit board; it is possible to provide a relatively small electrical moving "window" or image as the board is scanned by the CCD arrays. Selected points on this window are then addressed and the same or similar algorithms as in FIGS. 1–8 applied to test for defects in a continuous manner. Such an embodiment will now be described in connection with FIGS. 9–23.

Referring to FIG. 9, there is shown in schematic form a printed wiring board (PWB) inspection system. PWB's 10 are placed on a transport 12, such as a conveyor belt, and pass between a pair of illumination lamps 14 and 16 disposed on either side of transport 12. It is important that the PWB 10 be accurately registered on the transport 12 so that PWB defects can be verified on a companion machine (not shown) containing a computer-controlled X-Y table to position detected defects in the field of view of a TV camera display system. Registration may be accomplished using tooling holes on the PWB 10 or the edges of the board. Solenoids 34 and 32 used for registration and clamping, respectively, of the PWB are energized by signals from scanner command and status unit 40.

Unit 40 receives transport position signals from transport control unit 30 which is fed by encoder 28 and tachometer 26. Transport drive motor 24 is driven by transport control unit 30 in response to command and clock signals from status unit 40.

Lamps 14 and 16 may comprise linear tungstenhalogen lamps energized by lamp supply voltages from power supplies 36 and 38. The lower lamp 16 is used for imaging artwork by transmitted light through a slit not shown in transport 12. The same principles discussed herein with respect to PWB inspection are used in the transmissive mode. Therefore, it will be understood that the invention is not limited to PWB inspection by reflective light, but is equally applicable to inspection of light transmissive media.

It should be understood that system control calibration and synchronization (clock) signals are generated by computer 44 which may, for example, comprise a DEC PDP-11. These signals are coupled to appropriate portions of the system via calibration bus 44c, test bus 44b, defect report bus 44f command and status cable 44d and system clock cable 44e.

Light source 14 and beam splitter 18 are preferably included in a light integrating cavity 17. Cavity 17 functions as an isotropic light producing means. Lamp or light source 14 produces light which passes through a light diffuser (not shown) and which strikes interior wall portions of the light integrating cavity 17 which are preferably coated with a flat white paint. Lens 20 and CCD 22 are positioned along optical viewing axis 20a and a skewed beam-splitter 18 is positioned at an angle with respect to the viewing axis. Preferably, the beam-splitter has a light transmission factor of about 10%. Light reflected, for example, by a wall portion of cavity 17, and striking the surface of beam-splitter 18, is re-reflected along optical axis 20 toward the PWB board being viewed through a slit or aperture 11 (not shown) in the bottom of cavity 17.

As light is reflected a number of times within integrating cavity 17, uniform illumination of any object positioned within aperture 11 results. Thus, all portions of PWB conductors are made visible eliminating problems associated with off-axis blind spots.

Figure 10:
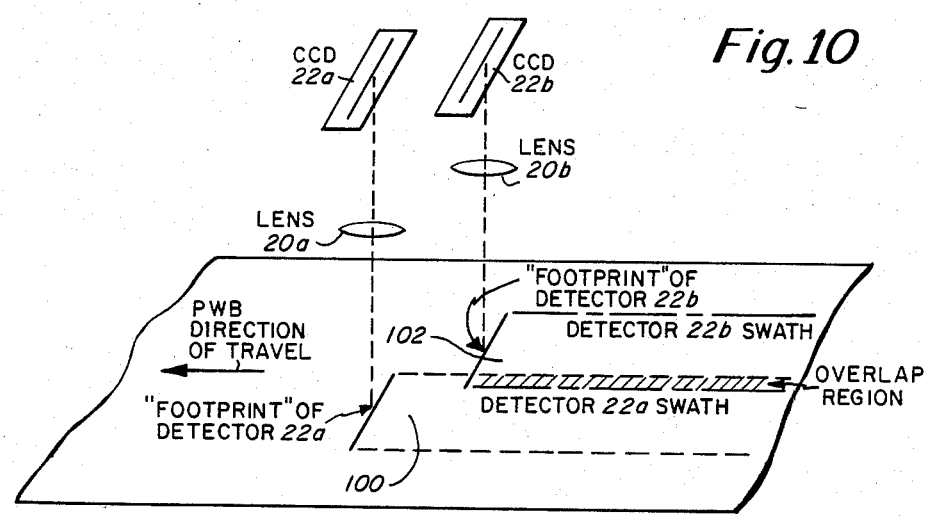
FIG. 10 is a schematic illustration of a portion of the electro-optics of FIG. 9.

A plurality of individual lenses 20 focus the reflected light on a series of photodetectors comprising Charge Coupled Device (CCD) arrays 22. While only one lens 20 and CCD array 22 are shown for simplicity in schematic form in FIG. 9, it should be understood that a sufficient number of arrays are arranged in parallel adjacent each other to cover an entire PWB in one pass. For example, five Fairchild 121 CCD's each covering one inch can be used to inspect a five inch PWB. Two such CCD's are shown in FIG. 10 for illustration purposes. The CCD's 22 convert the light image reflected from PWB 10 into an electronic image, each element in the array forming a "pixel".

A CCD consists of a multiplicity of photosensors on which charges are built proportional to the luminous energy reflected from PWB 10. In a preferred embodiment, each CCD comprises a 2048 element CCD array. The photosensors in the CCD array are electronically scanned line by line by signals from drive circuit 46 triggered by a CCD clock signal emanating from scanner command and status circuit 40. The CCD's 22 are aligned with their scan dimensions perpendicular to the long axis of the PWB 10. Thus, while the CCD's 22 are mechanically fixed, as the PWB moves by the CCD's, overlapping electronic image, "footprints" 100 and 102 are created of the PWB 10, as shown in FIG. 10.

As will be explained in more detail later, because the defect detection logic of the invention depends only on the structure of the PWB conductor patterns in a localized area; the CCD's 20 may be operated in independent processing channels, i.e., in parallel, covering different regions of the PWB 10. This results in a substantial gain in operating speed over a series configuration. The image fields must merely overlap and need not be accurately registered pixel-by-pixel. Registration need only be as accurate as desired defect location accuracy.

Since it is not necessary for the image fields to cover overlapping fields at the same time, considerable flexibility in the placement of each CCD array 20 is afforded, as shown in FIG. 10, from which it can be seen that CCD 22b and lens 20b may be horizontally displaced from CCD 22a and lens 22a.

The output of drive circuit 46 comprises five channels of suitably synchronized analog signals, one channel for each array. The analog signals represent in electrical form, the line-by-line scanned image of the PWB seen by the CCD arrays in sequential order. These signals are coupled via conductor 46a to a plurality of threshold circuits 48, one for each CCD.

THRESHOLD CIRCUIT

For simplicity, only one such threshold circuit is shown in FIG. 9. Circuits 48 provide threshold determination and conversion to digital form prior to subsequent processing. "Thresholding" is needed to distinguish between conductors and insulators based upon the analog voltage signal from the CCD's 22. A preferred embodiment of an appropriate threshold circuit 48 will now be described in connection with FIG. 11.

Figure 11:
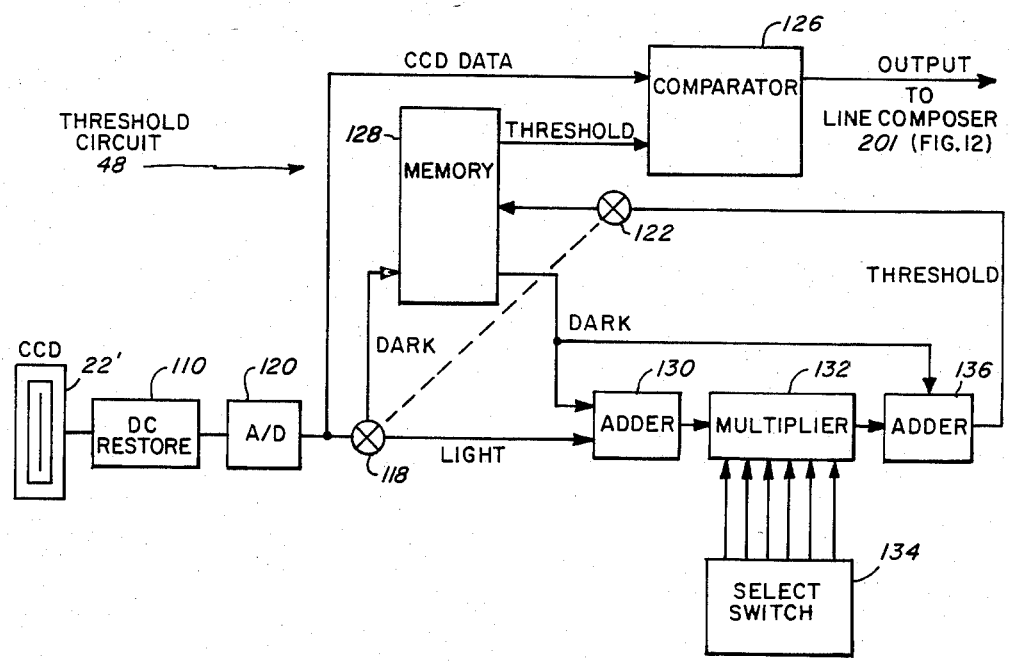
FIG. 11 is a schematic illustration of the threshold circuitry of the embodiment of FIG. 9.

Prior to actual defect detection operation, the circuit of FIG. 11 is calibrated for dark-level (no conductor) response by supplying a calibration signal from computer 44 via bus 44c (FIG. 9). During "dark" signal calibration, switch 118 is enabled and 122 is disabled to cause the output signal from A/D converter 120 to be coupled to a 2048×6 bit memory device, such as a storage register. Switch 122 allows the output of adder 136 to pass to memory 128. During calibration, the CCD 22' is caused to scan a representative black (or dark) strip. The "dark" strip data ($D_i$) from each pixel is digitized in A/D converter 120' and stored in the 2,048-word register 128. Next, the circuitry is calibrated for "light" level acquisition by scanning a representative "light" strip with CCD 22'. During "light" signal calibration, switch 118 connects A/D converter 120 to Adder 130 and switch 122 is closed.

When the representative "light" strip is scanned, the digitized "pixel" data ($L_i$) is added in adder circuit 130 to the negative of the corresponding "dark" pixel data $D_1$ to produce the difference signal ($L_i - D_i$). Next, a threshold value $T_i$ for each pixel is obtained according to the formula:

$$T_i = D_i + \Delta(L_i - D_i)$$

where
 $T_i$ = threshold for ith detector element
 $D_i$ = dark reference for ith detector element
 $L_i$ = light reference for ith detector element
 $\Delta$ = threshold factor $T_i$ is obtained by multiplying the difference signal $L_i - D_i$ by a factor $\Delta$. The factor $\Delta$ is coupled to multiplier 132 from select switch 134. The factor $\Delta$ is a variable percentage selected by the system operator which subjectively appears to produce the best defect deduction results for a given PWB set of illumination conditions. After multiplication; the dark signal $D_i$ from memory 128 is added in ADDER 136 to the multiplied signal from multiplier 132 to provide $D_i + \Delta(L_i - D_i) =$ threshold value ($T_i$) for each pixel. These 2,048 threshold values are now stored in the pixel memory 128.

In operation, switches 118 and 122 are open. Each CCD scan line of pixels is digitized in A/D converter 120 and compared in comparator 128 with its corresponding stored threshold value $T_i$ to obtain the binary value 0 or 1. The stored threshold values for each pixel are fixed for the duration of the scan of each PWB. Gross reflectivity variations over the PWB may upset the foregoing threshold results. On the other hand, the method corrects for all illumination variations as well as any other fixed nonuniformities.

The output of each of the threshold circuits 48 from each comparator 126 is a digitized binary signal corresponding to the image area viewed by each element of each corresponding CCD array 221.

MATRIX FORMING MEMORY AND MATRIX

As shown in FIG. 12, the outputs of each of the comparators 126 in Threshold Circuits 48 are coupled in parallel to a Parallel to Serial Line Composer 201 (FIG. 12) and arranged in a conventional manner in appropriate sequence in a serial bit stream 10240 pixels long (5 arrays×2048 number of pixels per array). The Line Composer 201 may comprise a well-known "ping-pong" memory circuit wherein data is "read in" in one sequence and "read out" in the preferred sequence. This bit stream is coupled to a first 32 bit shift register 200 in matrix 52. Initially, the first 32 bits of the stream, that is one complete CCD scan line, is stored in this register. Subsequently, as each bit enters register 200, the contents of the last bit in the register is dumped out. At the same time, a bit enters register 200 from composer 201, it is also coupled to a first memory 202 of Matrix Forming Memory 50 wherein a complete line of 5 CCD's, i.e., 10240 bits is also stored in memory.

As each bit or pixel from 201 enters register 200, a corresponding bit (corresponding to a pixel) from the preceding line is coupled from memory 202 into register 206. Eventually, the entire matrix 52 consisting of 32 registers each capable of accumulating 32 bits is filled such that as pixel P on line L, represented by (P,L) enters register 200 in matrix 52, a bit corresponding to pixel P of the preceding scan line L-1 enters register 206 from line memory 202, designated as (P,L-1) in FIG. 12. Likewise, a bit corresponding to pixel P line L-31 (P,L-31) enters the 31st register 208 of matrix 52.

Each of the 31 line memory units 202–210 contain in storage 31 lines of pixels, the contents of which are sequentially read into associated registers 206–208.

It may thus be seen that the 32 shift registers in matrix 52 contain an addressable matrix of 1024 bits representing a 32×32 bit moving "window" corresponding to a portion of the image sensed at a particular point in time by the 5 CCD arrays 22. The matrix is continuously being updated, pixel-by-pixel, such that each of the 10240 pixels constituting one entire scanned image of the five CCD arrays sequentially passes through each point in the matrix. These points can be addressed and sampled by suitable point selection circuitry, as will be explained in connection with FIG. 13.

POINT SELECTION

Figure 13A:
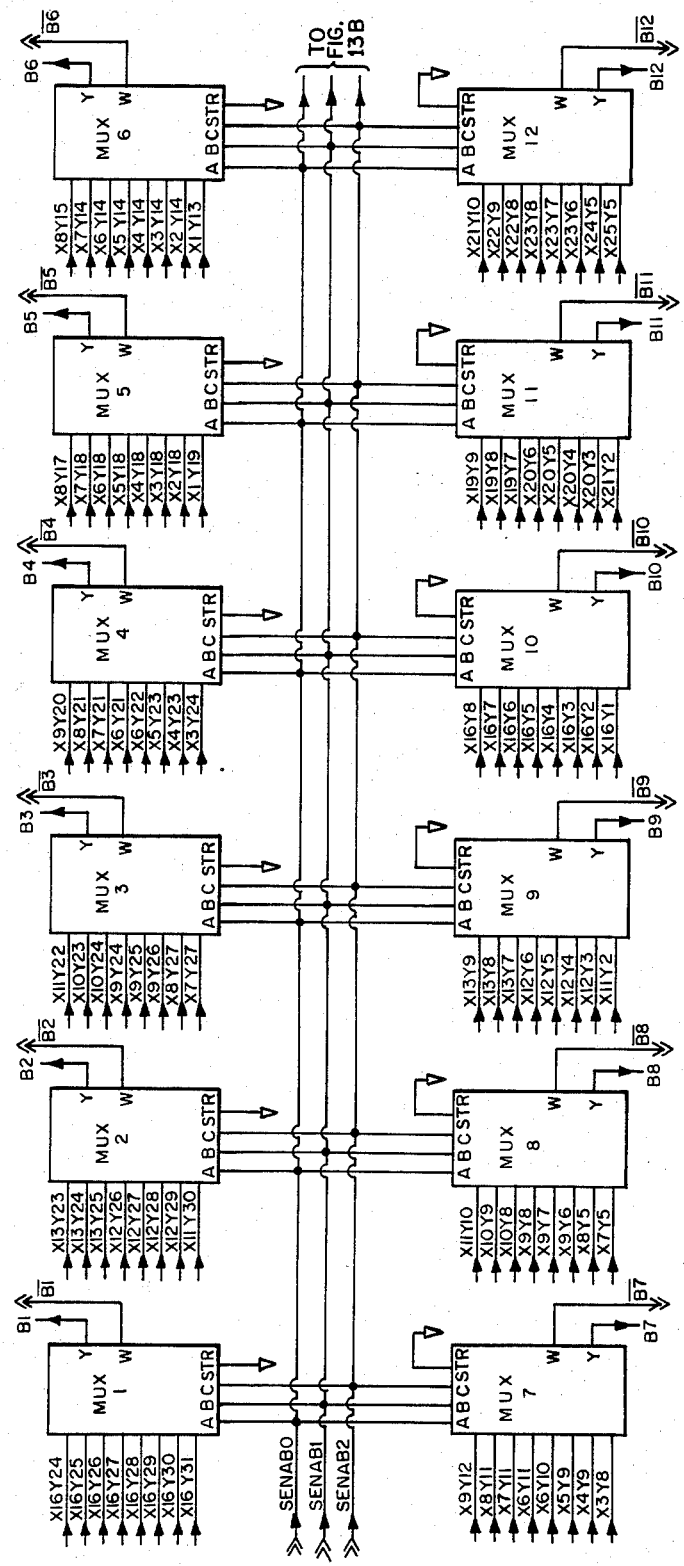
FIGS. 13A and 13B are a schematic diagram of a portion of the point selection circuitry of FIG. 9.
Figure 13B:
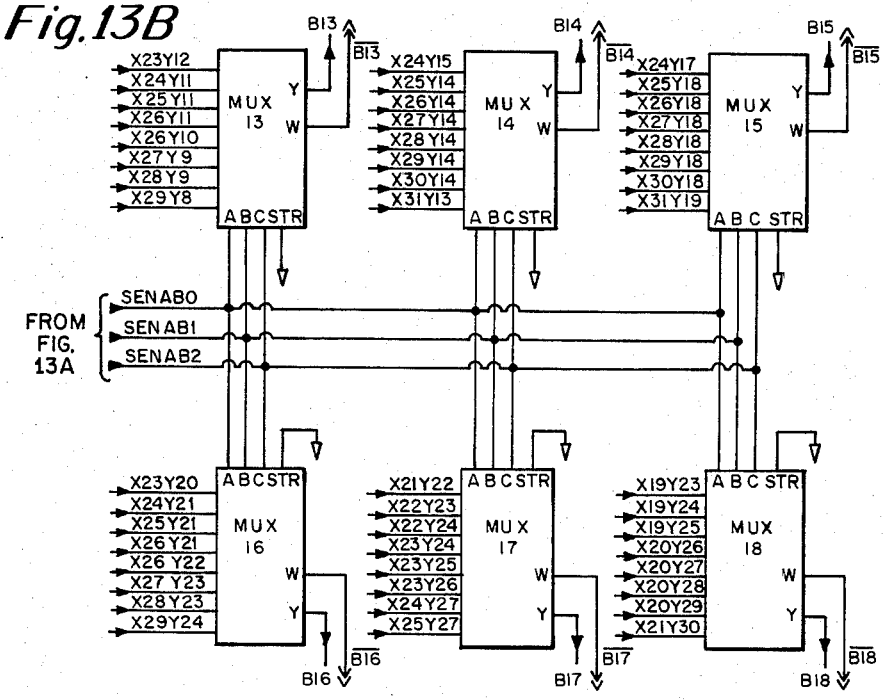

FIG. 13 A–B is a schematic of a portion of the point selection apparatus 56 (FIG. 9) of the invention, specifically the point selection apparatus for the A sensor fault detector. The nomenclature in FIG. 13 is based on the fact that each point in matrix 52 (each of the 32 output pins from the 32 shift registers) can be represented by an x and y coordinate, such as X1, Y1 in a Cartesian coordinate system. For example, X16, Y16 is a point in the center of the 32×32 matrix.

Thus, referring to 8 to 1 multiplex switch MUX 1 in FIG. 13, eight matrix points X16, Y24 through X16, Y31 are coupled to the input side of MUX 1 from matrix 52. These 8 points form a vertical path or upper radius 8 points high at the center of the matrix at the upper half of the matrix. Similarly, the input to MUX 10 has 8 matrix point X16, Y8 through X16, Y1 coupled to it forming a central vertical path or lower radius 8 points down in the lower half of the matrix.

The presence of a binary coded size select signal on lines SENAB0, SENAB1 and SENAB2 determines which of the eight input signals X16, Y24 to X16, Y31 are switched by MUX1 to output line B1 to form one of 18 points on a defect detection ring made up of the 18 points available at the outputs of the MUX's 1–18 of FIG. 13.

Each MUX covers a radial line of points extending from the center of the matrix but rotated 20° from one another. It may thus be seen that a set of radially extending defect detection points covering the 360° of the matrix may be selected by suitably enabling the multiplex switches MUX1-18.

In practice, the inverse of each MUX output is utilized by some of the defect logic circuits, therefore, the inverse of the outputs $\overline{B1}$-$\overline{B18}$, which is also available from each MUX, is shown and labelled $\overline{B1}$-$\overline{B18}$.

SENSOR A LOGIC

Figure 14:
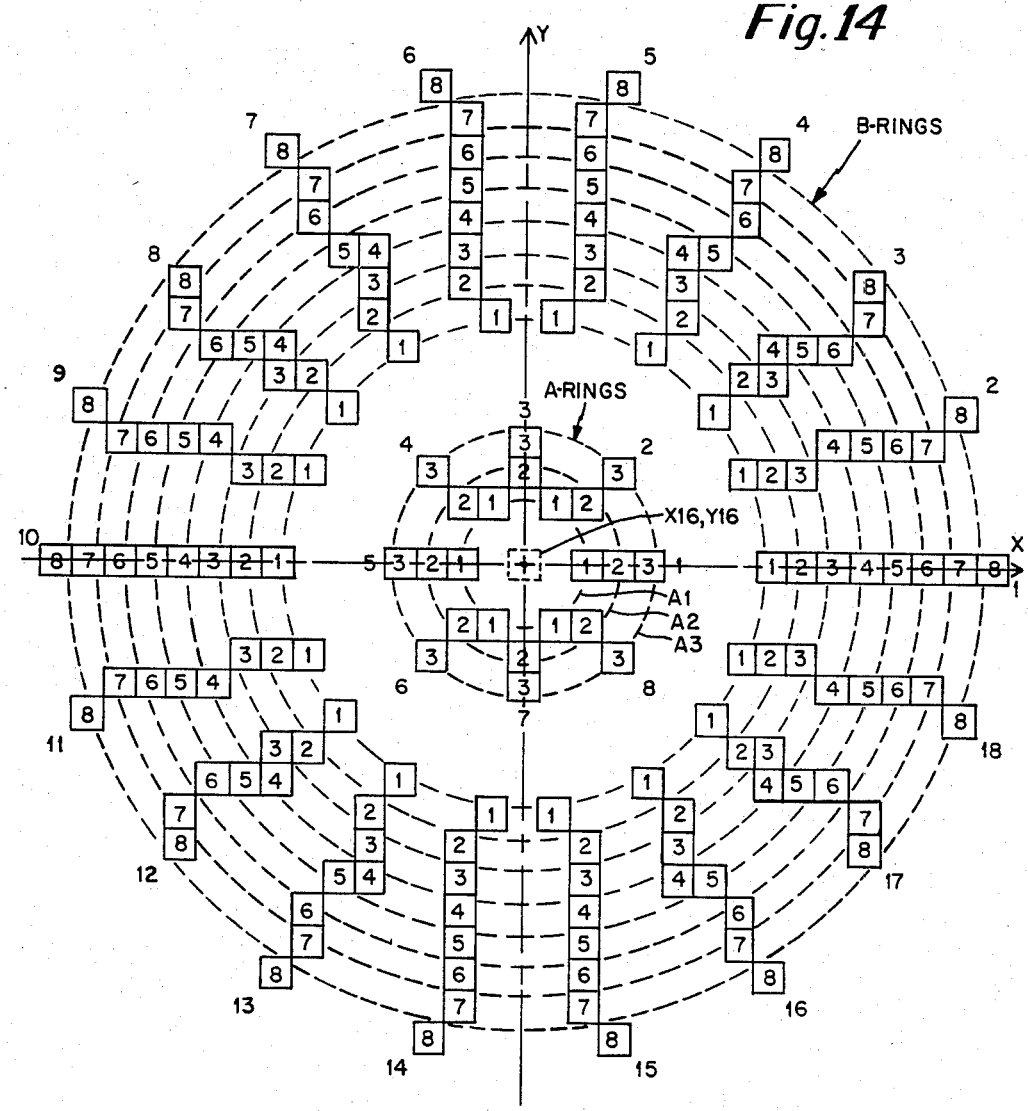
FIG. 14 is a representation of the sensor pattern arrangement for defect detection of unterminated conductors (Sensor A).

The logic principles for determining whether an unterminated conductor exists on a PWB utilizing the apparatus of the invention will now be explained in connection with FIGS. 14 and 15. FIG. 14 shows the sensor pattern used. It consists of three inner A enable rings, A1, A2 and A3, and eight outer defect detection B rings, B1-B8. The diameter of the A1 ring is $2.5\times10^{-3}$ inches or 5 pixels, A2 $3.5\times10^{-3}$ inches, A3 $4.5\times10^{-3}$ inches. The outer ring diameters are from $7.5\times10^{-3}$ inches to $15.5\times10^{-3}$ inches. Depending upon the minimum conductor width of the PWB under test, one of three inner A rings is chosen and one of the eight outer B rings is chosen. Chart I below lists the choices:

CHART I

| Minimum Conductor in inches × $10^{-3}$ | Sensor Points |
|---|---|
| 3.0 | A1 B1 |
| 4.0 | A1 B2 |
| 5.0 | A2 B3 |
| 6.0 | A2 B4 |
| 7.0 | A2 B5 |
| 8.0 | A2 B6 |
| 9.0 | A3 B7 |
| 10.0 | A3 B8 |

The center square (shown in dotted lines since it does not form part of the enable ring), corresponds to data point X16, Y16 from matrix 52. As previously noted, every pixel of the PWB image eventually passes in sequence through the center point X16, Y16 of this pattern.

The A1 enable ring is formed from 6 matrix points, and enable rings A2 and A3 from 8 matrix points, as shown in FIG. 14.

Figure 15:
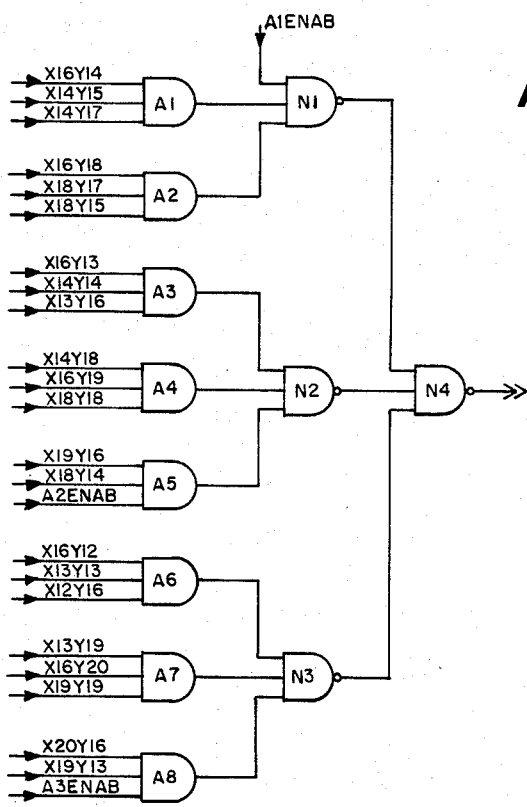
FIG. 15 shows the logic circuitry for the Sensor A enable ring.

FIG. 15 shows the A ring enable circuit logic. Three of the six A1 ring matrix points (X16, Y14; X14, Y15; X14, Y17) are coupled to the input of AND gate A1, the remaining three (X10, Y18; X18, Y17; X18, Y15) to AND gate A2. If all such points are on a conductor, the output of each of AND gates A1 and A2 will be a ONE. The outputs are fed to two of the three input terminals of NAND gate N1. The third input is an "ON" or ONE signal from A1 Enable Switch (not shown). The Enable switch is contained in the size selector circuitry used by the operator in Control Panel 42 (FIG. 9) to set the sensor size patterns.

In order for an "OFF" or ZERO signal to appear at the output of NAND gate N1, all three inputs must have a ONE signal indicating that all six points of the A1 enable ring are viewing a conductor and an enable signal must be present at N1.

The circuitry for the A2 and A3 enable rings is substantially identical as shown in FIG. 15 and comprises three AND gates A3–A5 and a NAND gate N2 for enable ring A2; and three AND gates A6–A8 plus NAND gate N3 for enable ring A3.

The NAND gate outputs are coupled to the input terminals of NAND gate N4. If any of the three inputs to N4 are "ZERO" a "ONE" appears at the output signifying that one of the three rings A1, A2 or A3, i.e., the one provided with an enable ring signal, has satisfied the logical condition that all pixel points on the ring are viewing a conductor.

Conversely, if one point on a selected ring is not viewing a conductor, a ZERO will appear at one of the AND gates causing a ONE out of one of the NAND gates and therefore, a ZERO out of the NAND gate N4, indicating a disable condition.

Figure 23:
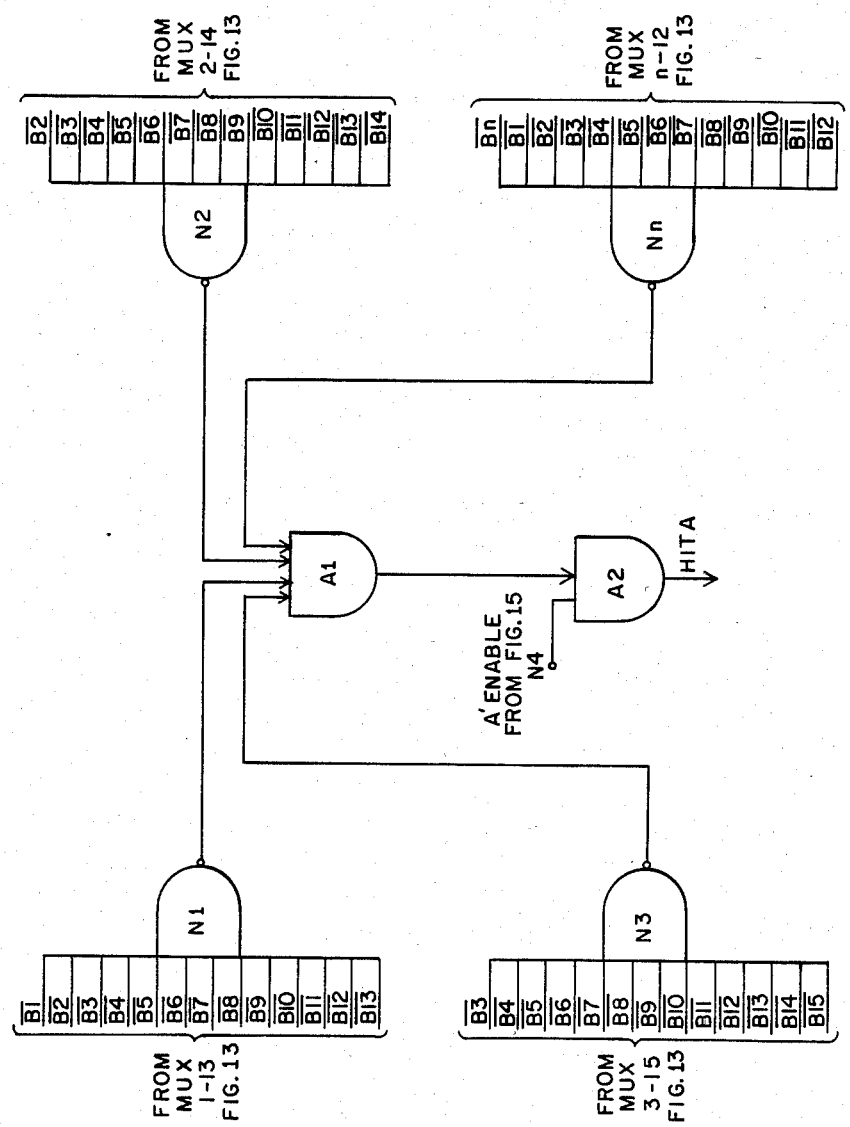
FIG. 23 shows the Sensor A (unterminated line) defect detection logic circuit.

If one of the three possible enable rings, A1–A3, indicates an enable condition by a ONE signal output from NAND gate N4, the appropriate one of eight rings 1–8 depending on the minimum conductor width (see Chart I) is coupled to a series of NAND gates as shown in FIG. 23. If 13 or more adjacent or consecutive B ring points are in a "ZERO" condition (meaning that a pixel at that point is on an insulator) an unterminated conductor defect is indicated as follows.

FIG. 23 shows four of "n" NAND gates N1 through Nn. In the preferred embodiment "n"=18; it being understood that the remaining 16 NAND gates are omitted for simplicity. The 13 input signals to NAND gate N1 are the NOT output of MUX's 1 to 13 of FIG. 13. These points correspond to 13 consecutive pixels in the sensors outer ring as selected by the MUX's. If all 13 logic states at the input to gate N1 are a "ONE", corresponding to 13 consecutive pixels representing insulator, the output of gate N1 will be a ZERO. The 13 input signals to N2 are the next 13 consecutive inverted pixel outputs from MUX's 2–14. If all pixels are OFF then the N2 input to NAND gate N19 is also a ZERO.

In order for a ONE output from NAND gate N19 to occur, any one or more of the inputs from N1-Nn must be a ZERO and hence, all of the inputs to one or more of the NAND gates N1-Nn must be ZERO's indicating an unterminated conductor defect. The N19 output is AND'ed with the A1 enable bit from N4 of FIG. 15. If both are ONE's, a HIT A is indicated signifying the presence of an unterminated conductor. As previously stated, in the present embodiment "n" is preferably 18; corresponding to the 18×20° positions through which the sensor A is, in effect, rotated.

SENSOR B

Minimum Conductor Width and Spacing

Sensor B operates on similar logic principles to those set forth on pages 14 and 15 above, namely, that if pairs of sensor points AB and CD in a ring of sensor points spaced 20° apart do not satisfy the logical expression $A \cdot B \cdot \overline{C} \cdot \overline{D}$, then a defect is present. The defect may be either the presence of a narrow conductor or the lack of minimum spacing.

The sensor B logic is implemented in 9 orientations 20° apart. Furthermore, a range of minimum conductor widths and spacings may be accommodated, as shown in Chart II below:

CHART II

SENSOR B ROTARY SENSOR  A-B CONDUCTOR TO CONDUCTOR SPACING
C-D CONDUCTOR WIDTH
$AB\overline{C}\overline{D}$ = DEFECT

| SYSTEM SETTINGS ANGLE | 3.0 / A1 | 4.0 / 3.5 / A2 | 5.0 / 4.5 / A3 | 6.0 / 5.5 / A4 | 7.0 / 6.5 / A5 | 8.0 / 7.5 / A6 | 9.0 / 8.5 / A7 | 10.0 / 9.5 / A8 | 10.5 / A9 |
|---|---|---|---|---|---|---|---|---|---|
| 90 | 14,16 | 13,16 | 12,16 | 11,16 | 10,16 | 10,16 | 9,16 | 8,16 | 6,16 |
| 110 | 14,15 | 13,15 | 12,15 | 11,14 | 10,14 | 10,14 | 9,14 | 8,13 | 7,13 |
| 130 | 14,15 | 14,14 | 13,13 | 12,13 | 11,12 | 11,12 | 11,12 | 10,11 | 8,10 |
| 150 | 15,14 | 15,13 | 14,13 | 14,12 | 13,11 | 13,11 | 13,10 | 12,09 | 11,07 |
| 170 | 16,14 | 15,13 | 15,12 | 15,11 | 15,10 | 15,10 | 15,09 | 15,08 | 14,06 |
| 190 | 16,14 | 17,13 | 17,12 | 17,11 | 17,10 | 17,10 | 17,09 | 17,08 | 18,06 |
| 210 | 17,14 | 18,13 | 18,13 | 19,12 | 19,11 | 19,11 | 20,10 | 20,09 | 21,07 |
| 230 | 18,15 | 18,14 | 19,13 | 20,13 | 21,12 | 21,12 | 21,12 | 22,11 | 24,10 |
| 250 | 18,15 | 19,15 | 20,15 | 21,14 | 22,14 | 22,14 | 23,14 | 24,13 | 25,13 |

| SYSTEM SETTINGS ANGLE | 3.5 / 3.0 / B1 | 4.5 / 4.0 / B2 | 5.5 / 5.0 / B3 | 6.5 / 6.0 / B4 | 7.5 / 7.0 / B5 | 8.5 / 8.0 / B6 | 9.5 / 9.0 / B7 | 10.5 / 10.0 / B8 |
|---|---|---|---|---|---|---|---|---|
| 270 | 19,16 | 20,16 | 21,16 | 22,16 | 23,16 | 24,16 | 25,16 | 26,16 |
| 290 | 19,17 | 20,17 | 21,18 | 22,18 | 23,18 | 24,19 | 24,19 | 25,19 |
| 310 | 18,18 | 19,19 | 20,19 | 21,20 | 21,20 | 22,21 | 23,22 | 24,22 |
| 330 | 18,19 | 18,19 | 19,20 | 19,21 | 20,22 | 20,23 | 21,24 | 21,25 |
| 350 | 17,19 | 17,20 | 17,21 | 17,22 | 17,23 | 17,24 | 18,25 | 18,26 |
| 10 | 15,19 | 15,20 | 15,21 | 15,22 | 15,23 | 15,24 | 14,25 | 14,26 |
| 30 | 15,19 | 14,19 | 14,20 | 13,21 | 13,22 | 12,23 | 12,24 | 11,25 |
| 50 | 14,18 | 13,19 | 12,19 | 11,20 | 11,20 | 10,21 | 9,22 | 8,22 |
| 70 | 13,17 | 12,17 | 11,18 | 10,18 | 9,18 | 8,19 | 8,19 | 7,19 |

| SYSTEM SETTINGS ANGLE | 3.0 / C1 | 4.0 / 3.5 / C2 | 5.0 / 4.5 / C3 | 6.0 / 5.5 / C4 | 7.0 / 6.5 / C5 | 8.0 / 7.5 / C6 | 9.0 / 8.5 / C7 | 10.0 / 9.5 / C8 | 10.5 / C9 |
|---|---|---|---|---|---|---|---|---|---|
| 180 | 16,13 | 16,12 | 16,11 | 16,10 | 16,09 | 18,08 | 16,07 | 16,06 | 16,05 |

CHART II-continued

| SENSOR B ROTARY SENSOR | | | A-B CONDUCTOR TO CONDUCTOR SPACING C-D CONDUCTOR WIDTH A·B·C̄·D̄ = DEFECT | | | | | |
|---|---|---|---|---|---|---|---|---|
| 200 | 17,13 | 17,12 | 18,11 | 18,10 | 18,09 | 19,08 | 19,08 | 19,07 | 20,06 |
| 220 | 18,14 | 19,13 | 19,12 | 20,11 | 20,11 | 21,10 | 22,09 | 22,08 | 23,01 |
| 240 | 19,15 | 19,14 | 20,14 | 21,13 | 22,13 | 23,12 | 24,11 | 25,11 | 26,10 |
| 260 | 19,15 | 20,15 | 21,15 | 22,15 | 23,15 | 24,15 | 25,14 | 26,14 | 27,14 |
| 280 | 19,17 | 20,17 | 21,17 | 22,17 | 23,17 | 24,17 | 25,18 | 26,18 | 27,18 |
| 300 | 19,17 | 19,18 | 20,18 | 21,19 | 22,19 | 23,20 | 24,20 | 25,21 | 26,21 |
| 320 | 18,18 | 19,19 | 19,20 | 20,21 | 20,21 | 21,22 | 22,23 | 22,24 | 23,24 |
| 340 | 17,19 | 17,20 | 18,21 | 18,22 | 18,23 | 19,24 | 19,24 | 19,25 | 20,26 |

| SYSTEM SETTINGS ANGLE | 3.5 3.0 D1 | 4.5 4.0 D2 | 5.5 5.0 D3 | 6.5 6.0 D4 | 7.5 7.0 D5 | 8.5 8.0 D6 | 9.5 9.0 D7 | 10.5 10.0 D8 | |
|---|---|---|---|---|---|---|---|---|---|
| 0 | 16,20 | 16,21 | 16,22 | 16,23 | 16,24 | 16,25 | 16,26 | 16,27 | |
| 20 | 15,20 | 14,21 | 14,22 | 14,23 | 13,24 | 13,24 | 13,25 | 12,26 | |
| 40 | 13,19 | 13,20 | 12,21 | 12,21 | 11,22 | 10,23 | 10,24 | 9,24 | |
| 60 | 13,18 | 12,19 | 11,19 | 10,20 | 9,20 | 8,21 | 7,21 | 6,22 | |
| 80 | 12,17 | 11,17 | 10,17 | 9,17 | 8,17 | 7,18 | 6,18 | 5,18 | |
| 100 | 12,15 | 11,15 | 10,15 | 9,15 | 8,15 | 7,14 | 6,14 | 5,14 | |
| 120 | 13,14 | 12,14 | 11,13 | 10,13 | 9,12 | 8,12 | 7,11 | 6,11 | |
| 140 | 13,13 | 13,12 | 12,11 | 12,11 | 11,10 | 10,09 | 10,08 | 9,08 | |
| 160 | 15,12 | 14,11 | 14,10 | 14,09 | 13,08 | 13,08 | 13,07 | 12,06 | |

Chart II shows the X and Y coordinates selected for each of 9 angles 20° apart versus each of 16 possible A and C minimum conductor spacing distances and each of 16 possible B and D minimum conductor width distances. For example, the setting 3 in column 1 tests for minimum line width and spacing of 0.003 inches. Points A1=X14, Y16; B1=X19, Y16; C1=X16, Y13 and D1=X16, Y20 are selected from matrix 52 by B sensor point select circuit 700 (FIG. 14) and the logic A·B·C̄·D̄ =DEFECT applied to the signals at these points.

Figure 16:
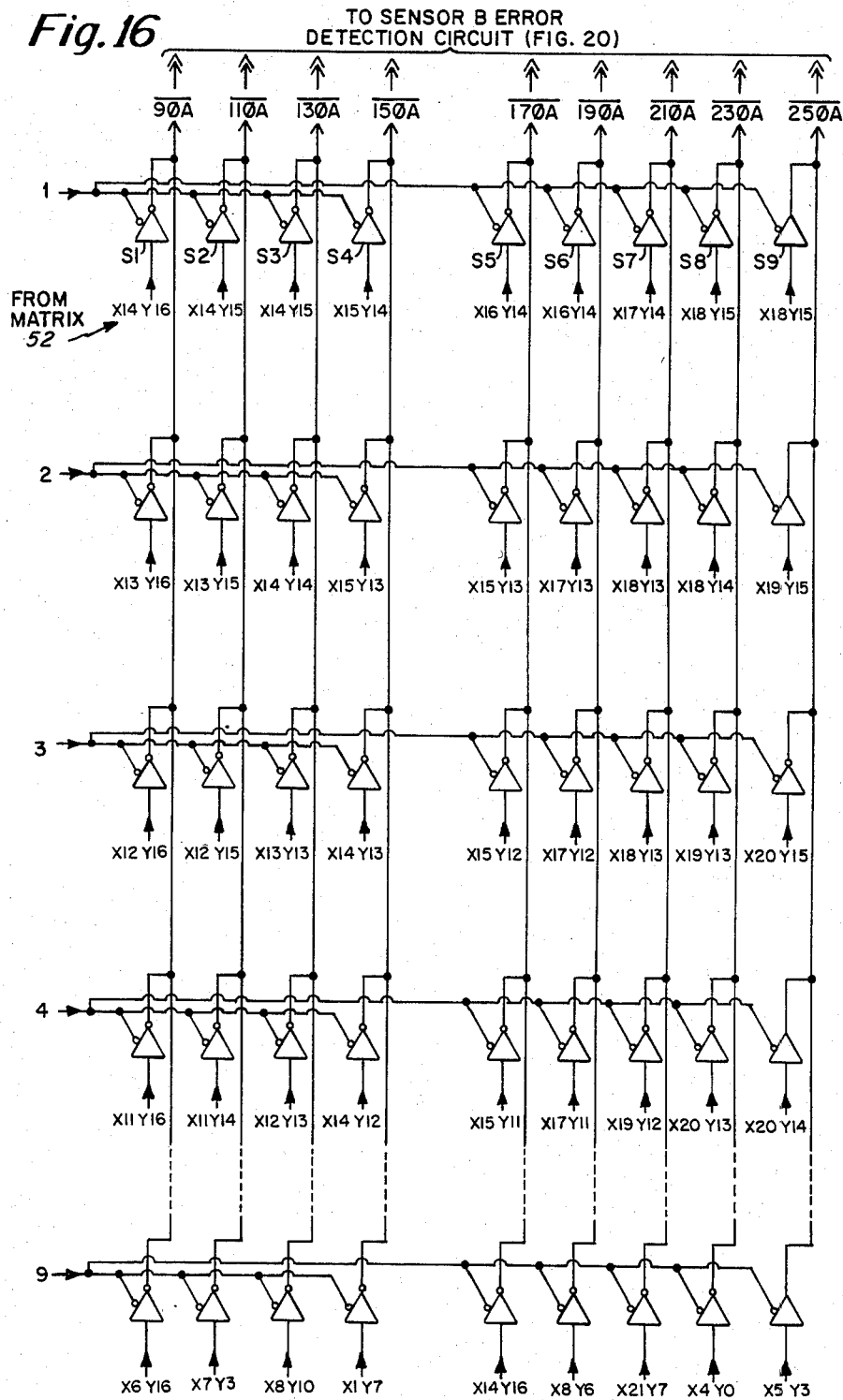
FIG. 16 shows the Sensor B (minimum line width and spacing) point selection circuit.

Referring now to FIG. 16, a portion of the point selection circuit for Sensor B is shown comprising a 9×9 array of 81 tri-level binary switches S1-S81. These switches are provided to select the appropriate signals for the 9 distant settings of the A points. For simplicity, only the first 4 lines and 9th line of the array are shown and only switches 1-9 and 81 are labelled. Furthermore, it should be understood that three additional similar arrays are needed to cover the possible settings for the B, C and D points. For simplicity, these additional arrays are not shown. Those skilled in the art will be able to produce them from the description provided in connection with FIG. 14 and Chart II, and Chart III.

Assuming the operator desires to test for minimum conductor width and spacing at a setting of 0.003 inches, a select switch (not shown) in control panel 42 (FIG. 9) is switched to this setting and a voltage signal is provided at line 1 of FIG. 14 enabling each of the 9 tri-state buffer switches S1-S9. When the switches are enabled, the 9 signals X14 Y16-X18 Y15 from the matrix 52 present on the input side are coupled to the output side to provide the 9 angular position signals 90° A-250° A as shown. Chart II above may be referred to for the complete listing of matrix connection points to implement the principles shown in FIG. 14.

The B sensor pattern may be viewed as a series of opposite pairs of pixels, as shown in FIG. 17 in the first of 9 orientations each 20° apart. Depending upon the minimum conductor width and spacing under test, one of the 16 paired configurations of A and B pixels points are selected and one of the 16 paired configurations of C and D pixel points from matrix 52 are selected in accordance with Chart III below:

CHART III

| Conductor Width in Inches | Pixel Points | Conductor Space in Inches | Pixel Points |
|---|---|---|---|
| .003 | A1,B1 | .003 | C1,D1 |
| .0035 | A2,B1 | .0035 | C2,D1 |
| .004 | A2,B2 | .004 | C2,D2 |
| .0045 | A3,B2 | .0045 | C3,D2 |
| .005 | A3,B3 | .005 | C3,D3 |
| .0055 | A4,B3 | .0055 | C4,D3 |
| .006 | A4,B4 | .006 | C4,D4 |
| .0065 | A5,B4 | .0065 | C5,D4 |
| .007 | A5,B5 | .007 | C5,D5 |
| .0075 | A6,B5 | .0075 | C6,D5 |
| .008 | A6,B6 | .008 | C6,D6 |
| .0085 | A7,B6 | .0085 | C7,D6 |
| .009 | A7,B7 | .009 | C7,D7 |
| .0095 | A8,B7 | .0095 | C8,D7 |
| .010 | A8,B8 | .010 | C8,D8 |
| .0105 | A9,B8 | .0105 | C9,D8 |

Figure 20:
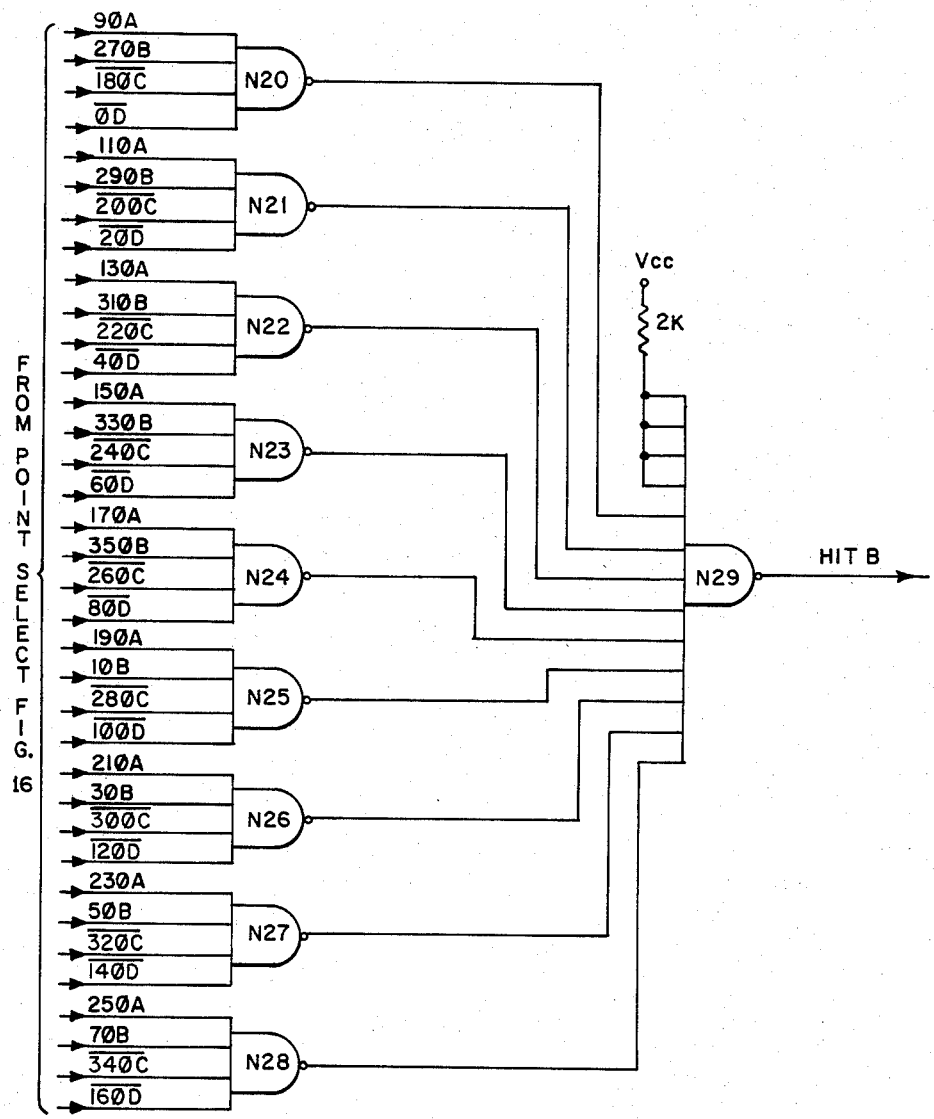
FIG. 20 shows the Sensor B (minimum line width and spacing) error detection circuit.

FIG. 20 shows the logic circuitry for defect detection of the B-Sensor. The nine A, B, C and D pixels from the point selector circuit FIG. 16 for each 20 degrees of the sensor pattern provide the four input signals to nine NAND gates N20-N28. The outputs of these NAND gates are inputted to NAND gate N29. If all four of each of the inputs to each of NAND gates N20-N28 do not obey the logical condition A·B·C̄·D̄, then all ONE's appear at the input to NAND gate N29 and a ZERO appears at the output of N29 signifying no defect. If any one or more of the four inputs obey the logical condition A B C D, at least one of the inputs to N29 will be a ZERO resulting in a ONE output signifying a defect or HIT B.

SENSOR C—SMALL AREA DEFECT

The Sensor C—Small Area Defect logic will now be described in connection with FIGS. 18 and 19.

The Sensor C pixel pattern is illustrated in FIG. 18 and comprises an X pattern of five B pixels B1-B5 forming an X with the central pixel B3 located at matrix point X16, Y16; i.e., the center of the matrix window. Eight A pixels A1-A8 form a square pattern around the B pixels to complete the Sensor C pattern as shown in FIG. 18.

The logical condition to be satisfied for Sensor C is that if all A pixels are the same, then all B pixels must be the same or else there is a defect. In other words, if all A pixels are on a conductor, thus presenting an ON or ONE signal, then all B pixels must also be on a conductor or else there is a small area defect in the PWB pattern. The converse is also true; that if all A pixels are on an insulator, all B pixels should present a ZERO indicating an insulator image.

Figure 19:
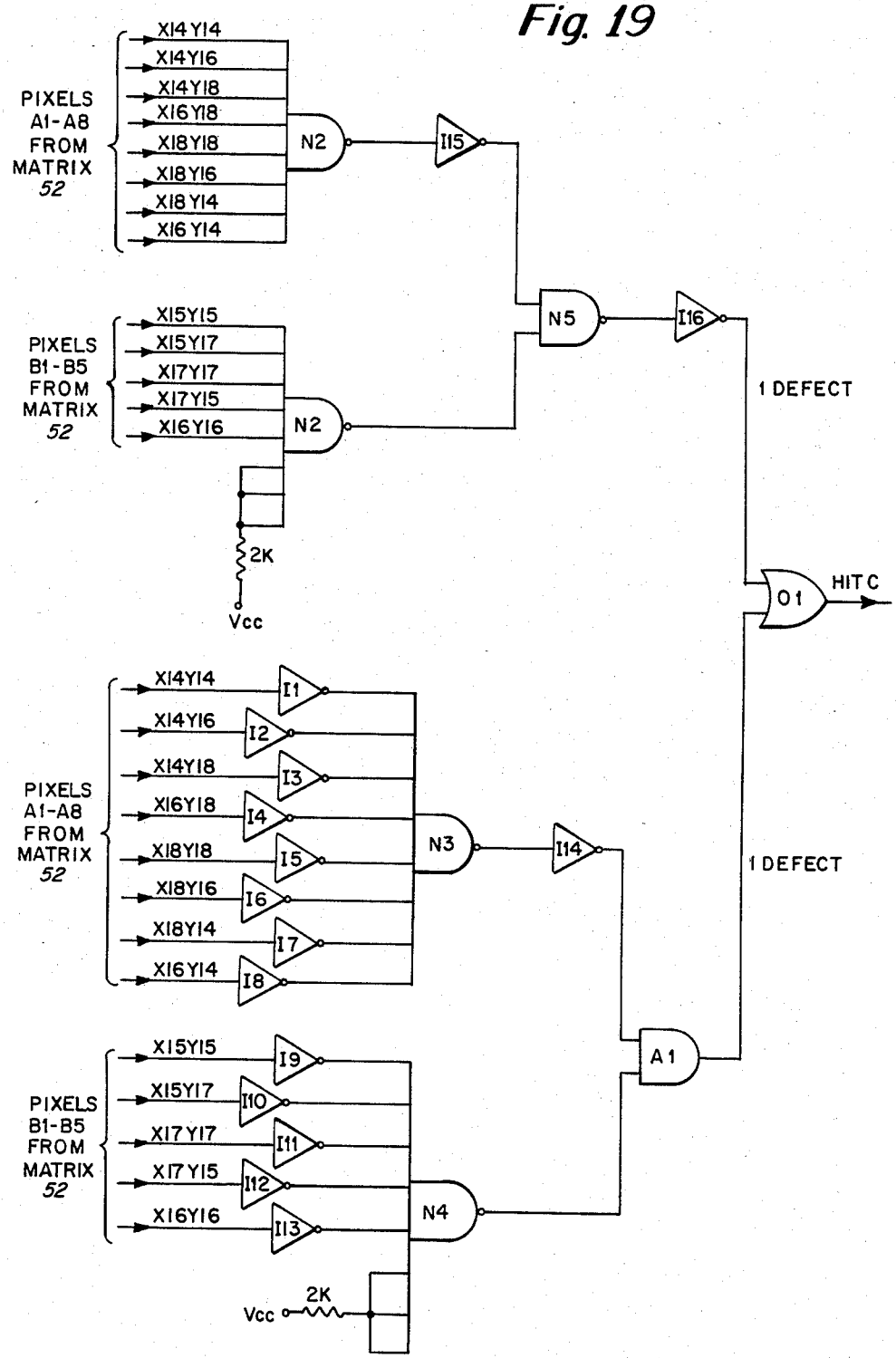
FIG. 19 shows the Sensor C (small area defect) error detection circuit.

The circuit of FIG. 19 implements the above Sensor C logic. The upper half of the circuit comprising NAND gates N1, N2, N5; and Inverters I15 and I16 check for small area defects in conductors as follows:

The eight outer pixels, A1-A8, forming a box around 5 inner X pixels, B1-B5, are coupled in parallel from matrix 52 of FIG. 9 to the input terminal of NAND gate N1. If all inputs are in the ONE state, the output of N1 is a ZERO indicating the presence of a conductor or conductor pad. If any input to N1 is a ZERO, the output of N1 is a ONE. The N1 output is inverted in NOT gates I15 and provides one of two inputs to NAND gate N5.

The other input is the NAND of pixels B1-B5 from matrix 52 provided by NAND gate N2. If all B1-B5 pixels are on a conductor, the output of N2 to N5 is a ZERO. Thus, if all inputs to N1 and N2 are ONE's, the two inputs to NAND gate N5 are a ZERO from N2 and a ONE from I15. In this case, the NAND output from N5 will be a ONE which, after being inverted to a ZERO by NOT gate I16 and OR'ed with the output of AND gate A1 in OR gate 01, will be a ZERO signifying no defect.

Conversely, if any of the B1-B5 pixel inputs is a ZERO, NAND gate N2 outputs a ONE which is NAND in N5 with the ONE output of I15 to produce a ZERO output from N5 signifying a defect as a ONE after inversion in NOT gate I16 and being OR'd in OR gate 01.

The bottom half of FIG. 19 shows the inverse logic condition utilizing the A1-A8 and B1-B5 pixels to check for the presence of a small area of conductivity on an insulator. The A1-A8 and B1-B5 pixels from points in matrix 52 are inverted by NOT gates I1-I13. The inverted A1-A8 signals are coupled to the input terminal of NAND gate N3. The output of N3 is inverted in NOT gate I14 and provides one of the two input signals to AND gate A1. The other input signal is the logical NAND from N4 of the five B pixels, B1-B5.

Thus, when all eight A pixels are viewing an insulator, the input to I14 is a ZERO which becomes a ONE at the A1 input from I14. If, at the same time, one of the B pixels is a ONE indicating a conductor, then the output of N4 is a ONE. The AND of a ONE and ONE at A1 is a ONE, signifying a defect.

If either input to OR gate 01 is a ONE, a defect or "HITC" is indicated at the output of OR gate 01.

D SENSOR—FAT LINE SENSOR

Figure 22A:
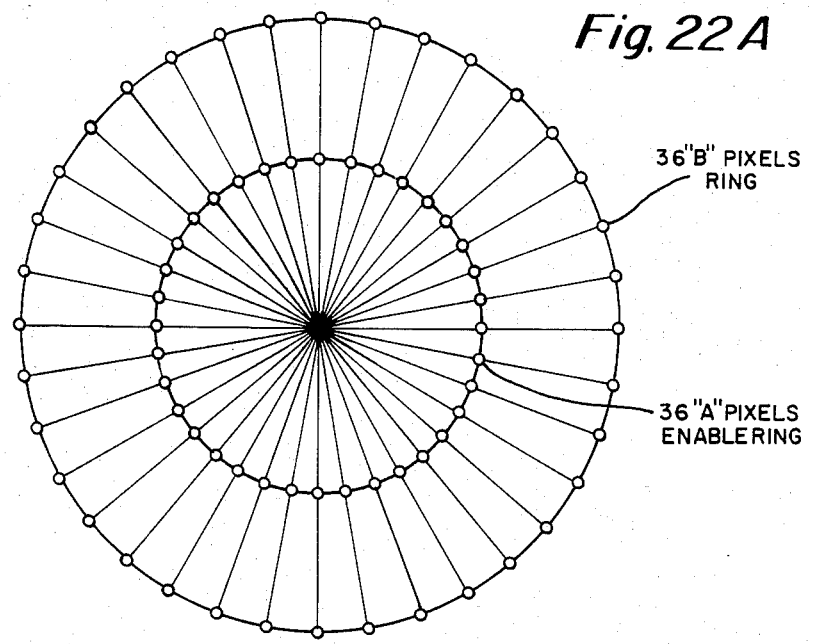
FIGS. 22a-d show details of the sensor pattern arrangement for Sensor D.

The D Sensor pattern, as shown in FIG. 22(a) comprises two concentric circles or "rings" of pixels. The inner circle is an Enable ring of 36 "A" pixels spaced 10° apart to cover a complete circle. The diameter of this Enable ring is slightly greater than the maximum line width. Thus, if all pixels on this Enable ring are in a ONE condition, a possible Maximum Line width violation is indicated. Alternatively, the pixels may be viewing a pad or a line corner, consequently a further check is required.

Figure 22B:
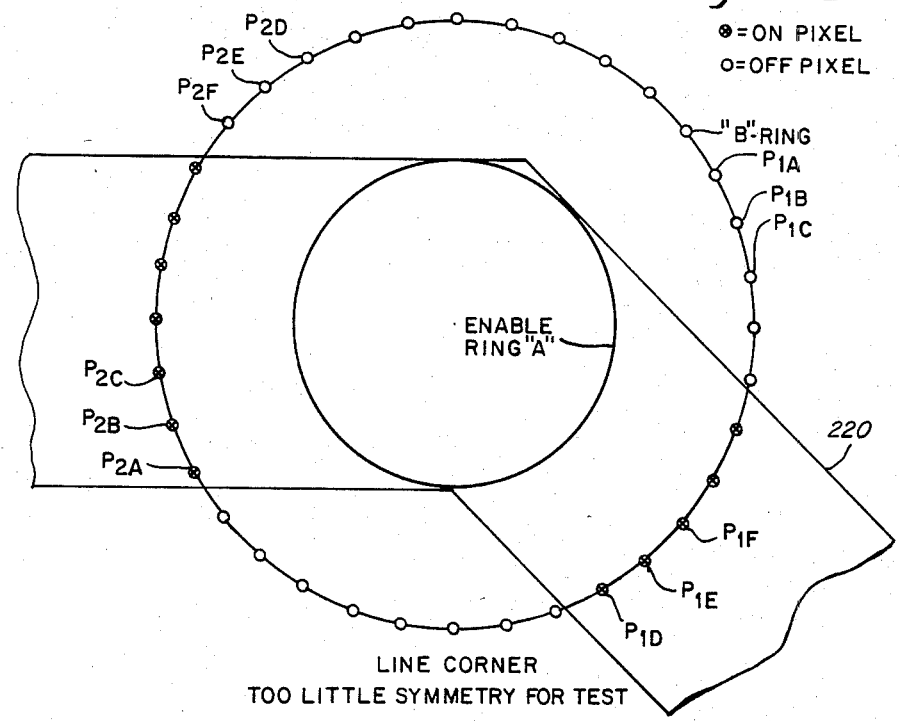

This check is performed by a second sensor ring of 36 "B" pixels spaced 10° apart having a diameter about twice the size of the inner A Enable ring. The outer ring is used to check how well opposite pixels on the outer ring match based on the assumption that a straight line is symmetric about the origin. As shown in FIG. 22(b), if the Enable ring "A" is centered on a line corner 220 of a PWB, a possible Maximum Line Width violation condition might be indicated by all of the A pixels being on "ON". However, if corresponding pixels on the Outer Ring, such as P1A and P2A or P1D and P2D are compared, it will be seen that the non-symmetry creates an inequality in the pixel conditions, such that, for example, P1A is "OFF" while P2A is ON.

Figure 22C:
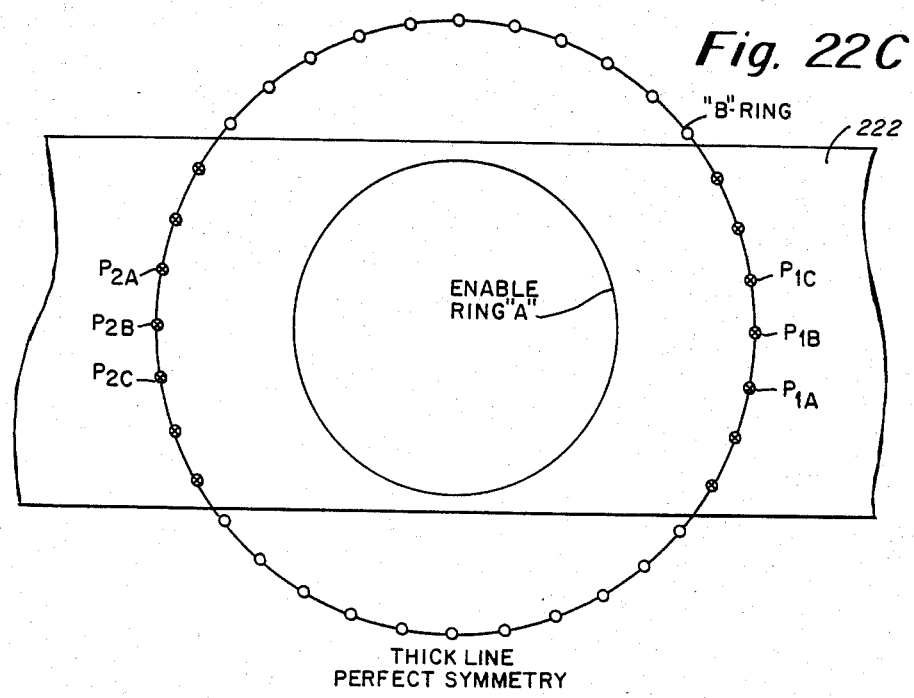

FIG. 22(c) shows the true Fat Line condition in which Fat Line conductor 222 provides an Enable signal for the inner A ring with all 36 pixels "ON" and all opposite outer ring pixels providing a match.

In the present embodiment, if 3 or more opposite pixel mismatches occur on the outer ring, a Fat Line defect is not indicated. Conversely, if less than 3 mismatches (logic states not identical) occur, a Fat Line defect is indicated; subject to one more check to see if the sensor pattern is on a pad or other layer feature.

Figure 22D:
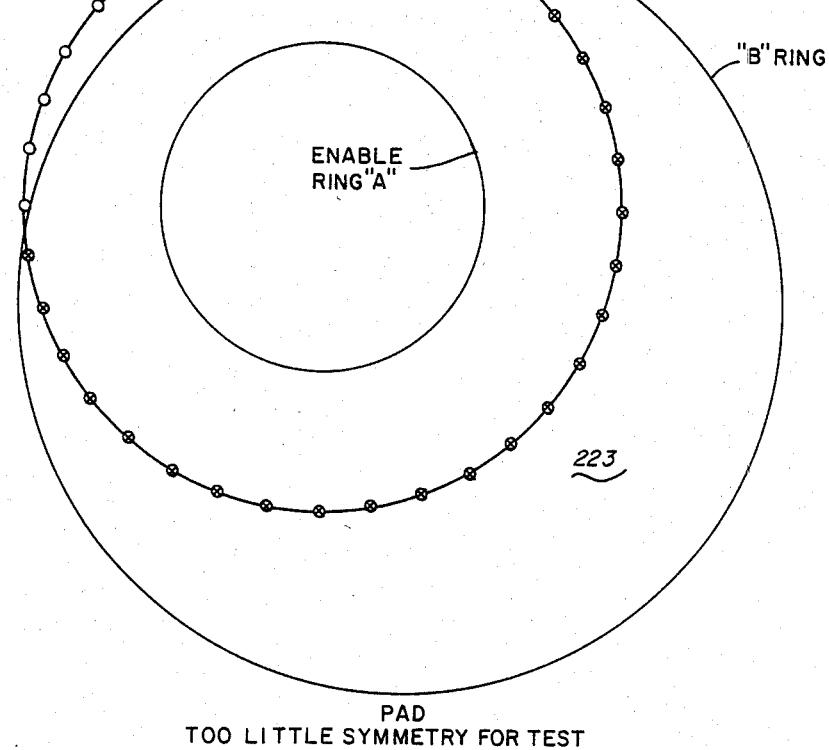

As shown in FIG. 22(d), a large Pad 223 would provide an enable condition for the inner ring with all pixels in the ON state. Also, if the outer ring is entirely or nearly entirely inside the pad, sufficient symmetry could occur such that less than 3 opposite pixel mismatches would occur. Thus, the final D-sensor test is to count the number of ON pixels in the outer ring. If too many are ON (in the preferred embodiment, more than 16) then a PAD D-sensor disable signal is provided.

Figure 21:
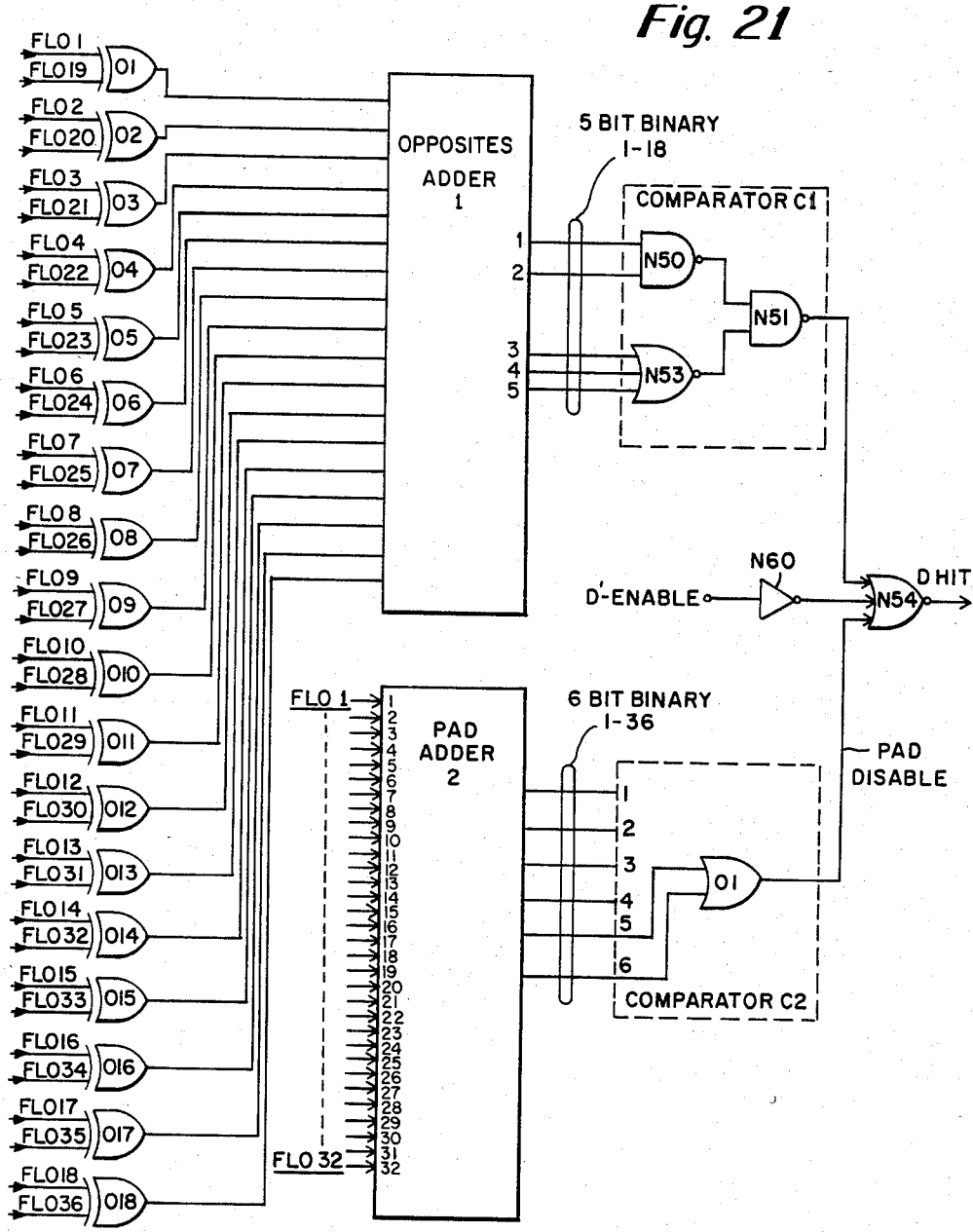
FIG. 21 shows the Sensor D (fat line defect) error detection circuit.

The logic circuits for implementing the above D-sensor Fat Line defect detection are shown in FIG. 21; wherein 18 opposite pixel pairs are fed from points selected on matrix 52 to 18 separate Exclusive OR gates 01-018.

The opposite pixel pairs are selected from matrix 51 by a point select circuit substantially identical to that shown in connection with the B sensor select circuit of FIG. 16 comprising a series of tri-state buffer switches and, therefore, need not be further described herein except to identify the input terminology used in FIG. 21 by reference to Chart IV below:

CHART IV

| Ring | FLO1 | FLO2 | FLO3 | FLO4 | FLO5 | FLO6 | FLO7 |
|---|---|---|---|---|---|---|---|
| 1 | X17Y27 | X14Y27 | X12Y26 | X10Y26 | X9Y25 | X7Y23 | X7Y21 |
| 2 | X15Y28 | X14Y28 | X12Y27 | X10Y26 | X8Y25 | X7Y23 | X6Y21 |
| 3 | X15Y28 | X14Y28 | X12Y27 | X10Y26 | X8Y25 | X7Y23 | X6Y22 |
| 4 | X15Y29 | X13Y29 | X11Y28 | X9Y27 | X8Y25 | X6Y24 | X5Y22 |
| 5 | X15Y29 | X13Y29 | X11Y28 | X9Y27 | X7Y26 | X6Y24 | X5Y22 |
| 6 | X15Y30 | X13Y30 | X11Y29 | X9Y28 | X7Y26 | X5Y24 | X4Y22 |
| 7 | X15Y30 | X13Y30 | X11Y29 | X8Y28 | X7Y26 | X5Y25 | X4Y22 |
| 8 | X15Y31 | X13Y31 | X11Y30 | X8Y28 | X6Y27 | X5Y25 | X3Y23 |
| 9 | X15Y31 | X13Y31 | X10Y30 | X8Y29 | X6Y27 | X4Y25 | X3Y23 |
| 10 | X15Y32 | X12Y31 | X10Y31 | X8Y29 | X6Y27 | X4Y25 | X2Y23 |

CHART IV-continued

| Ring | FLO1 | FLO2 | FLO3 | FLO4 | FLO5 | FLO6 | FLO7 |
|------|------|------|------|------|------|------|------|
| 11 | X15Y32 | X12Y32 | X10Y31 | X7Y30 | X5Y28 | X3Y26 | X2Y23 |

Chart IV shows 7 of the 36 possible point select matrix points FLO1-FLO36 available from the D sensor point select circuit in one of 11 different ring sizes depending on the size selection. For simplicity, the remaining 29 points have been omitted. Thus, the signal FLO1 on the input side of OR gate 01 in FIG. 21 is one of the 11 possible pixels in the FLO1 column of Chart IV depending upon the ring size selected. The pixels opposite FLO1 are the FLO19 pixels. One of the FLO19 pixels is the second input signal to EXCLUSIVE OR gate 01. If both inputs to the EXCLUSIVE OR gate 01 is ZERO or both are ONE, a ZERO output occurs from the Exclusive OR gate. Conversely, if a mismatch occurs between the two input signals, the output signal is a ONE.

The output leads from each of gates 01-018 are coupled to an ADDER circuit, ADDER 1, wherein all ONE signals are added and the sum signal consisting of a 5 bit binary number is provided to a comparator circuit C1 to determine if three or more opposite pixel mismatches have occurred, in which case, no Fat Line Defect is indicated. The comparator C1 functions as follows:

The two least significant bits of the 5 bit binary signal are coupled from terminals 1 and 2 of comparator C1 to NAND gate N50. The higher order bits are coupled to NOR gate 53. If the 2 least significant bits are both ONE's or any higher order bit is a ONE, then there are more than 2 mismatches and a ONE output is obtained out of N51 indicating no Fat Line defect.

PAD ADDER 2 in FIG. 21 takes the same 32 input pixel signals FLO1-FLO32 as were utilized in connection with OR gates 01-018 and adds up the number of ONE's or ON pixels in the outer ring. If more than 16 are ON, then a PAD-D sensor disable signal is provided as follows:

The output of PAD ADDER 2 is a 6 bit binary number between 1 and 36. To determine if this number is 16 or more, one need only check the two most significant bits. The two most significant bits on leads 5 and 6 are therefore OR'ed in OR gate 01. If the binary number from PAD ADDER 2 is 16 or greater, then one of the leads 5 or 6 will have a ONE logic signal on it; but not both. Thus, if 16 or more outer pixels are ON, the output of comparator C2 from OR gate 01 to NOR gate N54 will be a ONE disable signal.

In summary, in order for a ONE or D-HIT signal out of NOR gate all three inputs (PAD DISABLE, the NOT of the D-Enable signal from NOT gate N60 and the Opposite Pixel comparison signal from N51) must be ZERO's.

Referring back to FIG. 9, the details of the Matrix Forming Memory Circuit 50 and matrix 52 has been explained in connection with FIG. 12; the Point Selection Circuit 56 in connection with FIGS. 13 and 16; and the Defect Detection Circuits 58 in connection with the descriptions of Sensors A-D FIGS. 14, 15 and 17-23.

The output from the Defect Detection Circuit 58 is either on ON signal indicating a HIT or DEFECT or an OFF no defect pulse which is coupled to a suitable Report Generation Circuit 60, which reports the XY address of the defect by pixel number, line number and defect sensor that detected the hit. From there, the data is forwarded to Computer 44 via bus 44f for display.

Test Data Interface 54 may be utilized to input test patterns to the matrix forming memory 50 to test system performance. These patterns may be generated in Computer 44 and coupled to interface 54 via bus 44b.

While the above-described embodiments of the invention are preferred, other configurations will be readily apparent to those skilled in the art and thus the invention is only to be limited in scope by the language of the following claims and equivalents.

What is claimed is:

1. The method of determining in patterned images of lines and spaces of predetermined line width and spacing the presence of lines exceeding the maximum allowable predetermined line width comprising the steps of:
   (a) forming pixels comprising a plurality of electronic signals corresponding to the patterned image;
   (b) arranging said pixels in two concentric rings of pixels;
   (c) said rings including an inner ring having a diameter slightly greater than the maximum allowable predetermined line width and an outer ring substantially greater than the maximum allowable predetermined line width;
   (d) determining the following:
      (i) if all pixels on said inner ring are in a logic state corresponding to a line image;
      (ii) if less than a predetermined number X of pixels on said outer ring are in the same logic state as (i) above;
      (iii) if less than Y number of selected opposite pairs of pixels on said outer ring are in identical logic state.

2. The method of claim 1 including the step of indicating a defect if all conditions (i), (ii) and (iii) are present.

3. The method of claim 1 wherein the number N of pixels on said inner ring and outer ring are 8 or more.

4. The method of claim 1 wherein Y is an integral number which is three or more, but is not greater than the closest integral number to 1/10th of N.

* * * * *